United States Patent
Xu et al.

(10) Patent No.: US 10,727,007 B2
(45) Date of Patent: Jul. 28, 2020

(54) ARMATURE CIRCUIT IN ELECTRIC TOOL AND BATTERY PACK SOCKET

(71) Applicants: Xinsheng Xu, Shanghai (CN); Xiaorong Kang, Zhuzhou (CN)

(72) Inventors: Xinsheng Xu, Shanghai (CN); Xiaorong Kang, Zhuzhou (CN)

(73) Assignees: Xinsheng Xu, Shanghai (CN); Xiaorong Kang, Zhuzhou (CN)

( * ) Notice: Subject to any disclaimer, the term of this patent is extended or adjusted under 35 U.S.C. 154(b) by 769 days.

(21) Appl. No.: 15/494,325

(22) Filed: Apr. 21, 2017

(65) Prior Publication Data

US 2017/0229255 A1  Aug. 10, 2017

Related U.S. Application Data

(63) Continuation of application No. PCT/CN2015/075188, filed on Mar. 27, 2015.

(30) Foreign Application Priority Data

Dec. 31, 2014 (CN) .......................... 2014 1 0855543

(51) Int. Cl.
| | |
|---|---|
| *H01H 1/06* | (2006.01) |
| *H01R 13/70* | (2006.01) |
| *H01R 13/24* | (2006.01) |
| *H01H 1/36* | (2006.01) |
| *H01H 1/44* | (2006.01) |

(Continued)

(52) U.S. Cl.
CPC .............. *H01H 1/06* (2013.01); *H01H 1/365* (2013.01); *H01H 1/44* (2013.01); *H01R 13/2421* (2013.01); *H01R 13/70* (2013.01); *H02K 7/145* (2013.01); *H02K 11/00* (2013.01)

(58) Field of Classification Search
CPC . H01H 1/06; H01H 1/365; H01H 1/44; H01R 13/2421; H01R 13/70; H02K 7/145
See application file for complete search history.

(56) References Cited

U.S. PATENT DOCUMENTS

| | | | | |
|---|---|---|---|---|
| 5,892,885 A | * | 4/1999 | Smith | H01H 9/061 318/139 |
| 9,316,034 B2 | * | 4/2016 | Totani | E05C 21/00 |
| 9,434,056 B2 | * | 9/2016 | Seith | B25F 5/029 |

(Continued)

*Primary Examiner* — Terrance L Kenerly
(74) *Attorney, Agent, or Firm* — Wayne & Ken, LLC; Tony Hom

(57) ABSTRACT

The invention discloses an armature circuit in an electric tool and a power socket of the electric tool using the armature circuit, comprising a power supply and a motor. Two electrodes of the power supply are each provided with a connection structure connected to an output part. One connection structure is a multi-contact on/off controllable movable contact structure, and the other one is a double-faced multi-contact structure. According to the armature circuit, the internal resistance of the armature circuit of the motor is greatly reduced, the hardness of running characteristics of the motor is enhanced, and the working efficiency of the tool is improved; due to decreasing of the internal resistance, the current loss of the armature circuit is reduced, and the temperature rise of an electric appliance and contacts is reduced; with the same working efficiency, the battery capacity can be saved, and the battery cost is reduced.

15 Claims, 17 Drawing Sheets

(51) Int. Cl.
*H02K 7/14* (2006.01)
*H02K 11/00* (2016.01)

(56) References Cited

U.S. PATENT DOCUMENTS

2006/0237297 A1* 10/2006 Xu .................... H01H 9/063
                                                    200/522
2015/0165602 A1*  6/2015 Seith ................. B26B 11/003
                                                    173/46

* cited by examiner

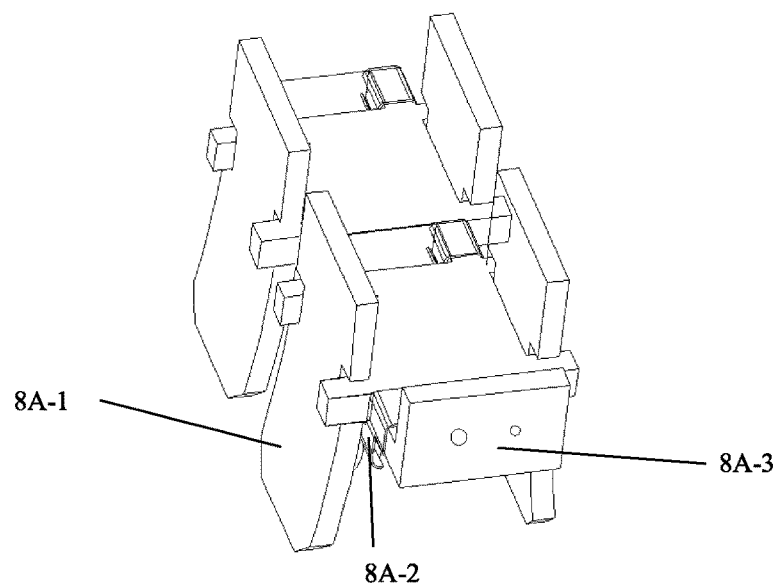
FIG.37
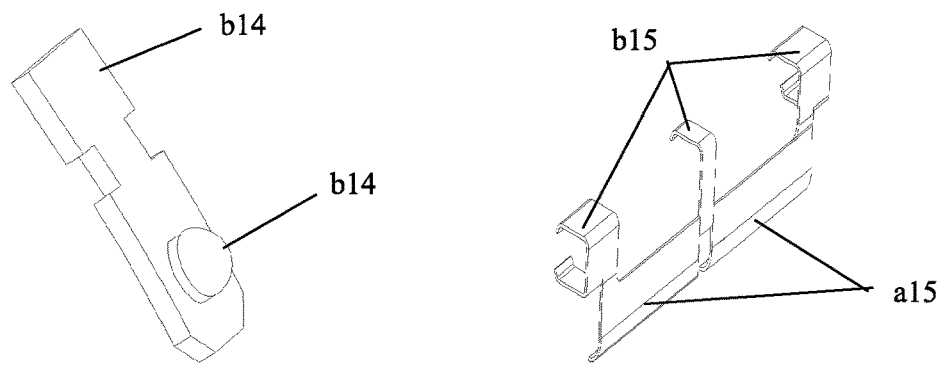
FIG.38
FIG.39
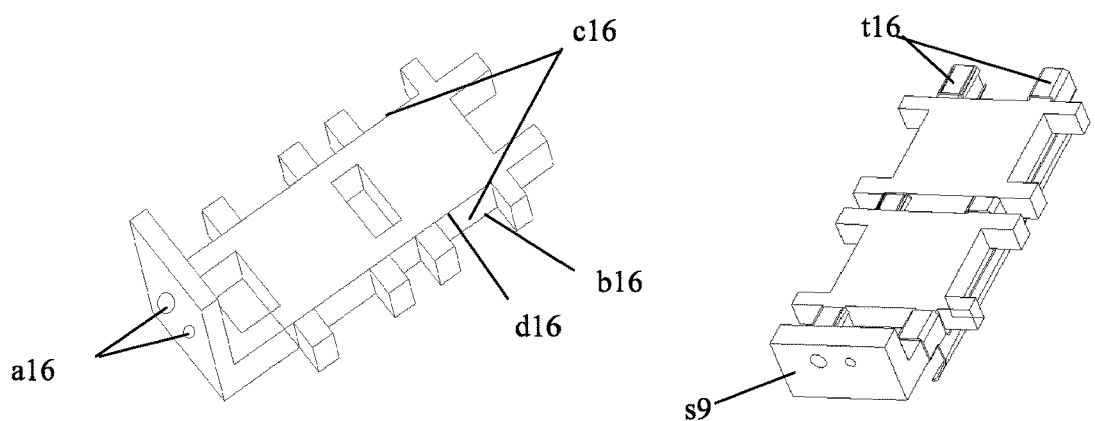
FIG.40
FIG.41

ARMATURE CIRCUIT IN ELECTRIC TOOL AND BATTERY PACK SOCKET

TECHNICAL FIELD

The present invention belongs to the field of electric tools, and relates to an armature circuit in a battery type electric tool and a battery pack socket structure.

BACKGROUND

In a traditional armature circuit in a battery type electric tool, as shown in FIG. 1 which shows a schematic diagram of the traditional armature circuit in the battery type electric tool, R1 and R2 in the figure are internal resistances of high-power transistors at both ends of a motor armature; R1=R2, and R1+R2=2R1; R3 is a contact resistance of a switch; R4 and R5 are the contact resistances of a positive electrode socket and a negative electrode socket for batteries; R4=R5, and R4+R5=2R4, so the total resistance of the armature circuit (exclusive of the resistance of a motor) $R_{total}$=R1+R2+R3+R4+R5=2R1+R3+2R4; and it can be seen that switch contact points, battery socket contact points and other internal resistances are connected in series, so the total internal resistance is large, and current loss is excessive, causing low efficiency of the tool.

Since the advent of the battery type electric tool, the motor is always connected with the switch contact points and elastic connection contact points for connecting battery packs in series. With the technical development of a tool motor and the technical development of a lithium battery as a tool power source in recent years, the power of the battery type electric tool is also developed. Due to the operating characteristics of low voltage and high current of the battery type electric tool, the contact resistances of external parts in the armature circuit of the tool motor become obstacles to expansion of tool power. The characteristic is that a rotating speed is apparently decreased with the increase of a motor load (current is increased), i.e., operating efficiency is decreased. In one operating cycle of the electric tool, e.g., drilling of holes in a board, with the decrease of the rotating speed, the time for the operating cycle is also prolonged, and power consumption is also increased for battery energy, so battery use efficiency is decreased. Meanwhile, temperature rise of each contact point part is increased to bring about unsafe factors.

Thus, an invention patent Switching Device of Shanghai Baicheng Electric Equipment Manufacture Co., Ltd. exists in the industry, to effectively use a multi-contact technology, and to overcome technical difficulties of German "Marquardt" Company which monopolizes a high-power switching technology for decades in the world. The core of the technology is to reduce the internal resistance of the switch, but the internal resistance cannot be eliminated. Meanwhile, international top electric tool brands, such as "Milwaukee" and "DeWalt" in the United States, "Bosch" in Germany, and "MaKita" in Japan, also start to develop single-piece elastic connection into double-sided elastic connection with respect to connection of battery packs of products since 2012; and a contact end is divided into two end surfaces, to form double-sided two points, with a total of four contact points, i.e., four contact resistances are connected in parallel. Two brands, "Milwaukee" and "DeWalt", belong to two companies in the United States, and dominate the high-end market of global battery type electric tools.

Even so, the above-mentioned existing art still does not change a traditional structure that the armature circuit is connected with the switch contact points and elastic static contact points of battery pack clips in series. Operating characteristics of hardness and the operating efficiency of the battery type electric tool and the energy efficiency of the battery still need to be improved.

SUMMARY

An objective of the present invention is to provide an armature circuit available for a battery type electric tool and a battery pack socket including the armature circuit and having an on-off function, for further reducing a proportion of external resistance in the armature circuit and increasing the operating efficiency of the electric tool.

To achieve the above objective, the present invention adopts a solution as follows:
1. Traditional switch contact points are canceled; and the internal resistances of the switch contact points in an original tool armature circuit are eliminated.
2. a positive electrode or a negative electrode adopts multiple contact points with an on-off function instead of adopting elastic static contact points; and the other of the positive electrode and the negative electrode adopts double-sided tilting contact with a circuit switching function instead of adopting double-sided elastic static contact.
3. An auxiliary elastic contact piece is added to a tilting position of a tilting contact piece of one of the positive electrode and the negative electrode, and is connected to tilting contact of the tilting contact piece in parallel, so as to enhance stability of the tilting contact and connect with a current channel in parallel.
4. An elastic contact point of one of the positive electrode and the negative electrode is designed as double-sided elastic connection, in which each side has at least three contact points and at least six contact points are connected in parallel, so as to reduce contact resistances.

An armature circuit in an electric tool, including a power supply and a motor, wherein two electrodes of the power supply are respectively provided with connection structures for connecting an output part; one of the connection structures is a multi-contact movable contact point structure capable of controlling on-off; and the other is a double-sided multi-contact structure.

Further, the movable contact point structure is a double-sided tilting contact structure with a circuit switching function; and the double-sided multi-contact structure has an on-off function.

An auxiliary contact piece is arranged at a tilting position of the double-sided tilting contact structure and is connected with a contact piece bracket tilted by the tilting contact piece in parallel, so as to enhance the stability of tilting contact and connect with an additional current channel in parallel.

Contacts of the double-sided multi-contact structure are arranged in a form of an isosceles triangle or a regular trapezoid.

N contact points are arranged on each side of the double-sided multi-contact structure; and N is an integer greater than three and less than seven.

A power supply socket for an electric tool adopting the above armature circuit, including:

a socket housing which can be fixed in a casing of the electric tool, wherein a connection part of the armature circuit is arranged in the socket housing;

an input part and an output part, which are fixed relative to the socket housing; the input part and the output part are components of the armature circuit; one end of the input part is connected with one end of the positive electrode or the negative electrode of the power supply by the double-sided multi-contact structure; the other end of the input end is electrically connected with the other electrode of the power supply to form a multi-contact movable contact point structure capable of controlling on-off; and the output part is connected to a required part by an electric wire to form the armature circuit;

one end of the input part and one end of the positive electrode or the negative electrode of the power supply are subjected to plug-in elastic connection; the other end of the input part is electrically connected with the other electrode of the power supply to form double-sided titling connection capable of controlling on-off;

at least two synchronous tilting contact components and one output contact component which can be connected with one electrode of the power supply in a tilting manner are provided, so that a socket has an on-off function;

further including:

an ejection head bracket assembly capable of reciprocating up and down;

a bracket spring, which is mounted between the socket housing and the ejection head bracket assembly for making the ejection head bracket assembly move up; two ejection heads inside the ejection head bracket assembly apply pressure to outer sides of the at least two tilting contact components under the action of elastic force of the spring; the ejection head bracket assembly enables the ejection heads to move at upper parts and lower parts of pivoting fulcrums of the tilting contact components, so that a tilting state is reversible to realize the on-off function;

a swing rod, which is arranged at the top of socket; one end of the swing rod is used as the pivoting fulcrum, and the other end props against a bulging part at the upper end of an ejection head bracket, so that the swing rod can pivot about the fulcrum, to compress the ejection head bracket assembly to move down.

The plug-in elastic electrical connection of the input part includes an elastic contact piece which is a double-sided clip formed by bending a conductive elastic material; a front part of the double-sided clip, being connected with an output contact piece of a battery pack, is divided into at least two elastic contact points; the upper end of a division part is further provided with at least one elastic contact point; the three elastic contact points are arranged in a form of an isosceles triangle; and double sides have at least six elastic contact points, i.e., at least six contact resistances are connected in parallel.

The electrical connection between the other end of the input part and the output contact piece at the other end of the battery pack is controllable; the electrical connection is composed of at least two tilting contact piece components and a tilting contact piece bracket provided with grooves in both sides; the tilting contact piece bracket is fixed relative to the socket housing; the two tilting contact piece components are mounted in the grooves in both sides of the bracket; by using positions for contacting bottoms of the grooves with the tilting contact piece components as the fulcrums, the tilting contact piece components pivotally tilt about the fulcrums; when external force is applied to the tilting contact piece components and is moved to one side of the fulcrums facing contact points of the tilting contact piece components, the tilting contact piece components rapidly tilt to the output contact piece of the battery pack, so that the contact points are connected with the output contact piece of the battery pack to complete the electrical connection; and when the external force is moved to one side of the fulcrums opposite to the contact points of the tilting contact piece components, the tilting contact piece components rapidly tilt to an opposite direction, so that the contact points of the tilting contact pieces are rapidly separated from the output contact piece of the battery pack to complete electrical disconnection.

One end of two elastic auxiliary contact pieces is respectively fixed at outer side parts of the grooves in both sides of the tilting contact piece bracket; the other end of the two auxiliary contact pieces is arranged inside the two tilting contact pieces in an arc surface suspension manner; when pivoting to an output contact piece assembly of the battery pack, the tilting contact piece components first compress arc surface parts at the other end of the two auxiliary contact pieces, and then continue to pivot to the output contact piece of the battery pack, until the contact points of the tilting contact components are connected with the output contact piece of the battery pack; at this moment, current from the output contact piece of the battery pack flows to the tilting contact piece assembly through the contacts at one end of the tilting contact components located on both sides of the output contact piece of the battery pack; part of the current flows to the tilting contact piece bracket through the tilting contact pieces and the fulcrums for supporting the pivoting of the tilting contact pieces, i.e., the grooves in both sides of the tilting contact piece bracket are pivotally connected with the tilting contact pieces; and meanwhile, the other part of the current flows to fixed connection ends fixed on both sides of the tilting contact piece bracket through the arc surface ends of the two auxiliary contact pieces pressed by the tilting contact pieces, i.e., flows to the tilting contact piece bracket. The two auxiliary contact pieces are respectively bridged at two ends of the at least two tilting contact pieces pivotally connected with the tilting contact piece bracket, to compensate and enhance electrical performance of pivotal connection.

The power supply socket includes a "┌┴┐"-shaped ejection head bracket; each of outer side parts on both sides of the ejection head bracket is provided with a rib; accordingly, one groove is formed in each of both sides of the position opposite to a socket base of a battery pack socket with the on-off function, so that the ejection head bracket moves up and down under the guidance of the grooves. A through hole is formed in each of both sides of the ejection head bracket; ejection heads and ejection head springs are mounted in the through holes; and cover plates are mounted on outer sides of two circular holes close to the bracket to enclose outer ends of the circular holes. One end of the ejection head springs is pressed on the cover plates, and the other end is supported in circular grooves in bottoms of inner holes of the ejection heads. Under the action of elastic force of the ejection head springs, the ejection heads move to a direction of a tip end part. An ejection head bracket assembly is composed of the ejection head bracket, the ejection heads, the ejection head springs and the cover plates.

The at least two tilting contact piece components on both sides are pivoted by mounting the at least two tilting contact piece components in the grooves in both sides of the tilting contact piece bracket and using the bottoms of the grooves as the fulcrums. Accordingly, when at least two ejection heads in the ejection head bracket assembly are extruded by the elastic force of the ejection head springs, the tip end parts are pressed outside the at least two tilting contact piece components; the ejection head bracket assembly moves up and down in guide grooves; the tip ends of the ejection heads on both sides are simultaneously pressed outside the tilting contact piece components and move up and down together with the bracket; and when the tip ends of the at least two ejection heads pass over the pivoting fulcrums of the at least two tilting contact piece components, the tilting state of the tilting contact piece components is reversed to realize the on-off function.

A bracket spring is mounted between the bulging part of the socket base and a lower part of a cross beam of the ejection head bracket; and the elastic force of the bracket spring drives the ejection head bracket assembly to move up along a guide groove.

One end of the swing rod is used as the pivoting fulcrum and is arranged at the bulging part at the upper end of a socket cover; and the swing rod can pivotally swing about the fulcrum. When the other end of the swing rod is pressed to pivotally move down and the ejection head bracket assembly is pressed to move down along the guide groove, if the force for pressing the swing rod to pivotally move down is smaller than the elastic force of the bracket spring, the bracket spring pushes the ejection head bracket assembly to rise, and one end of the swing rod is pivoted up.

The power supply is a battery pack.

The electric tool is a battery type electric tool.

Alternatively, a battery pack socket with an on-off function in a battery type electric tool, including:

a tool casing;

a variable resistance box, which is fixed relative to the tool casing;

a trigger push rod, which is held on the variable resistance box and can reciprocate longitudinally under the action of external force or elastic force of a trigger spring;

a socket housing, which includes a socket base and a socket cover and is fixed relative to the tool casing;

a first input part, which is arranged at one end of an elastic connecting clip with a plurality of arc surface contact points, and is fixed relative to the socket housing; an outer part facing a plane of the arc surface contact points at the other perpendicular end is abutted on a corresponding "⌴"-shaped plane of the corresponding socket base; both ends of the plane are clamped between two corresponding fixing ribs of the socket; two corresponding convex ribs on the socket cover compress an outer side of the plane; the elastic connecting clip is provided with two elastic contact pieces; the two elastic contact pieces are formed by bending an elastic conductive material; a front end of an input end of each elastic contact piece is divided into at least two elastic contact points; an upper end of a division part is further provided with at least one elastic contact point; the plurality of contacts are arranged in a form of an isosceles triangle or a regular trapezoid; double sides have at least six elastic contact points; current from one of the positive electrode and the negative electrode of the battery pack is received through plug-in elastic contact connection between the elastic connecting clip and one contact piece of a positive contact piece and a negative contact piece of the battery pack; the elastic contacts on the elastic connecting clip are designed as at least double-sided elastic connection, in which each side is provided with three contacts, and at least six contacts are connected in parallel, to greatly reduce contact resistances and reduce current loss under high current load;

a first output part, which is a circular hole in the plane at the other end of the elastic connecting clip; the current received by the elastic connecting clip is connected and transmitted to a PCB end of a control system and input ends (drains) of three groups of high power field effect transistors connected to one end of a motor in series through an electric wire passing through the circular hole in the plane of the other end;

a second input part, i.e., a socket on-off function component, which is composed of a plurality of tilting contact pieces, two auxiliary contact pieces and a tilting contact piece bracket; the socket on-off function component is fixed relative to the socket base through the tilting contact piece bracket; the plurality of tilting contact pieces are held in grooves in both sides of one end of the tilting contact piece bracket; by using positions for contacting bottoms of the grooves with the tilting contact pieces as the fulcrums, the tilting contact pieces pivotally tilt about the fulcrums to form a plurality of pivotal tilting contacts; and the tilting contact piece bracket is fixed relative to the socket base. When pressure on outer sides of the tilting contact pieces is moved down to pass over a lower boundary line of thickness of the tilting contact piece bracket facing one side of the tilting contact piece bracket in a direction of the contact points, the plurality of tilting contact pieces rapidly tilt to the other contact piece of the positive contact piece and the negative contact piece of the battery pack; the contact point at one end of each tilting contact piece is in contact with the other contact piece of the positive contact piece and the negative contact piece of the battery pack, to receive the current from the battery pack; when the plurality of tilting contact pieces tilt to the other contact piece of the positive contact piece and the negative contact piece of the battery pack, arc surfaces of the lower ends of the auxiliary contact pieces may be pressed first; this part is an arc surface elastomer; a plurality of tilting contact pieces and the two auxiliary contact pieces are subjected to elastic contact connection; the two auxiliary contact pieces are made of elastic conductive materials; a plurality of "⌶"-shaped clamping grooves in the upper ends of the auxiliary contact pieces are fixed on the tilting contact piece bracket; at this moment, the auxiliary contact pieces form a channel between the tilting contact piece bracket and the plurality of tilting contact pieces; thus, the current received by the tilting contact pieces is transmitted to the tilting contact piece bracket through two ways including pivotal tilting between the plurality of tilting contact pieces and the tilting contact piece bracket as well as the auxiliary contact pieces; when the plurality of tilting contact pieces are connected with the negative contact piece of the battery pack, the plurality of contact pieces and the auxiliary contact pieces are connected with the tilting contact piece bracket at the same time, to reduce the current loss; when the pressure on the outer sides of the tilting contact pieces is moved up to pass over an upper boundary line of thickness of the tilting contact piece bracket opposite to one side of the tilting contact piece bracket in the direction of the contact points, the other end of the plurality of tilting contact pieces is tilted to a central plane direction of the tilting contact piece bracket parallel to ground surfaces of the grooves in both sides, so that the contacts at one end of the plurality of tilting contact pieces are rapidly disconnected from the other contact piece of the positive contact piece and the negative contact piece of the battery pack, to complete the electrical disconnection; a second output part, which is the circular hole in the other end of the tilting contact piece bracket; the tilting contact piece bracket connects and transmits the received current to a negative end of a PCB of the control system and output ends (sources) of the three groups of high power field effect transistors connected to the other end of the motor in series through the electric wire passing through the circular hole in the other end of the figure;

an ejection head bracket assembly, which is composed of an ejection head bracket, a plurality of ejection heads, a plurality of ejection head springs and a plurality of ejection head covers; the ejection head bracket assembly is held between the socket base and the socket cover through the ejection head bracket under the action of the elastic force of a bracket spring; each of the outer sides at both sides of the ejection head bracket is provided with at least one guide rib; under the action of a swing rod and the bracket spring, the guide ribs outside the ejection head bracket can freely reciprocate up and down along the corresponding guide groove in the socket base; the plurality of ejection heads are held on the ejection head bracket; under the action of the elastic force of the ejection head springs, the ejection heads apply the pressure outwards on the ejection head bracket; meanwhile, under the action of the ejection head springs, tip end parts of the ejection heads are always compressed on the outer side surfaces of the two tilting contact pieces; when the ejection head bracket moves up and down, a tilting state of the plurality of tilting contact pieces can be rapidly reversed; when the ejection head bracket assembly moves down under the action of the pressure of the swing rod, and the tip end parts in front of the ejection heads move to pass over the lower boundary line of thickness of the tilting contact piece bracket facing one side of the tilting contact piece bracket in the direction of the contact points, the plurality of ejection heads rapidly reverse the plurality of tilting contact pieces under the action of the ejection head springs to tilt to one contact piece of the positive contact piece and the negative contact piece of the battery pack, so as to rapidly receive the current of one of the positive electrode and the negative electrode of the battery pack; when the ejection head bracket assembly moves up under the action of the elastic force of the bracket spring, and the tip end parts in front of the ejection heads move to pass over the upper boundary line of thickness of the tilting contact piece bracket opposite to one side of the tilting contact piece bracket in the direction of the contact points, the plurality of tilting contact pieces tilt to the central plane direction of the tilting contact piece bracket parallel to the ground surfaces of the grooves in both sides, so that the contact points of the plurality of tilting contact pieces are rapidly separated from one of the positive electrode and the negative electrode of the battery pack, to complete the electrical disconnection;

an upper pressing rod, which is held on the tool casing and the swing rod; a lower plane connected with an inclined surface at one end of the upper pressing rod props against a lower end plane of the trigger push rod facing the socket base; an arc surface tip end part at the other end of the upper pressing rod props against one end of the swing rod close to a pivotal swing fulcrum facing a plane in a switch direction; when the trigger push rod moves inwards under the action of the external force, the inclined surface of the trigger push rod connected with the lower end plane facing the socket base presses the inclined surface of one end of the upper pressing rod, so that the upper pressing rod rapidly moves down; the arc surface tip end part of the other end of the upper pressing rod ejects the swing rod to pivotally swing to the socket direction around the pivotal swing fulcrum at one end; the arc surface tip end part at the other end of the swing rod facing the socket direction ejects the ejection head bracket assembly to move to the direction of the contact points of the tilting contact pieces; however, when a lower end boundary line of the inclined surface of the trigger push rod passes over an upper end boundary line of the inclined surface of one end of the upper pressing rod, an upper plane connected with the inclined surface of one end of the upper pressing rod props against the lower end plane of the trigger push rod, and the position of the upper pressing rod keeps unchanged; when the trigger push rod moves outwards under the action of the elastic force of the springs, and the trigger push rod moves until the lower end boundary line of the inclined surface of the trigger push rod passes over the upper end boundary line of the inclined surface of one end of the upper pressing rod, the upper pressing rod moves up under the action of upward elastic force of the ejection head bracket assembly; when the lower end boundary line of the inclined surface of the trigger push rod passes over the lower end boundary line of the inclined surface of one end of the upper pressing rod, the upper pressing rod is completely reset;

the swing rod, one end of which is held on two fixing ribs of the socket cover through a metal pin; the metal pin is used as the pivotal swing fulcrum, the arc surface tip end part at the other end of the swing rod facing the socket direction ejects the plane of a bulging part at the upper end of the ejection head bracket assembly to pivotally swing about the pivotal swing fulcrum; when the trigger push rod moves inwards under the action of the external force, the upper pressing rod moves down; the arc surface tip end part at one end of the upper pressing rod ejects one end of the swing rod close to the pivotal swing fulcrum facing the plane in the switch direction to pivotally swing to the socket direction around the pivotal swing fulcrum; the arc surface tip end part at the other end of the swing rod facing the socket direction ejects the ejection head bracket assembly to move to the direction of the contact points of the tilting contact pieces; when the trigger push rod moves outwards under the action of the elastic force of the springs, and the trigger push rod moves until the lower end boundary line of the inclined surface of the trigger push rod passes over the upper end boundary line of the inclined surface of one end of the upper pressing rod, the ejection head bracket assembly has a space for moving to the direction of the trigger push rod; when the elastic force of the ejection head springs is greater than the pressure of the upper pressing rod, the ejection head bracket assembly ejects the arc surface tip end part of the swing rod facing the socket direction to pivotally swing to the direction of the trigger push rod around the pivotal swing fulcrum under the action of the elastic force of the ejection head springs, so that the swing rod is reset automatically; through the action of the swing rod, a motion stroke of the ejection head bracket assembly can be increased doubly, so that the battery pack socket achieves a rapid on-off function; and a bracket spring, which is mounted between the bulging part of the socket base and the lower part of a cross beam of the ejection head bracket and can eject the ejection head bracket assembly to move up, so that the plurality of tilting contact pieces are rapidly separated from one contact piece of the positive contact piece and the negative contact piece of the battery pack.

With adoption of the above-mentioned solution, the present invention has beneficial effects that:

The battery type electric tool has the characteristics of low voltage and high power. According to the present invention, the internal resistance of the armature circuit of the motor can be greatly reduced (the contact resistance R3 of the switch contact points is eliminated and the contact resistance for connection of the positive electrode is reduced); hardness in operating characteristics of the motor is improved; the operating efficiency of the tool is improved; the current loss of the armature circuit is decreased due to the decrease of the internal resistance; and temperature rise of electrical appliances and contact points is also decreased. In the case of same operating efficiency, the technology of the present invention can be adopted to save the battery capacity and reduce the battery cost.

BRIEF DESCRIPTION OF THE DRAWINGS

FIG. 37 is a schematic perspective view of the socket on-off functional component.

FIG. 38 is a schematic perspective view of the tilting contact piece.

FIG. 39 is a schematic perspective view of the auxiliary contact piece.

FIG. 40 is a schematic perspective view of the tilting contact piece bracket.

FIG. 41 is a schematic perspective view of the auxiliary contact piece fixed to the tilting contact piece bracket, wherein t16—auxiliary contact piece and s9—tilting contact piece bracket.

DETAILED DESCRIPTION OF THE INVENTION

Figure 1:
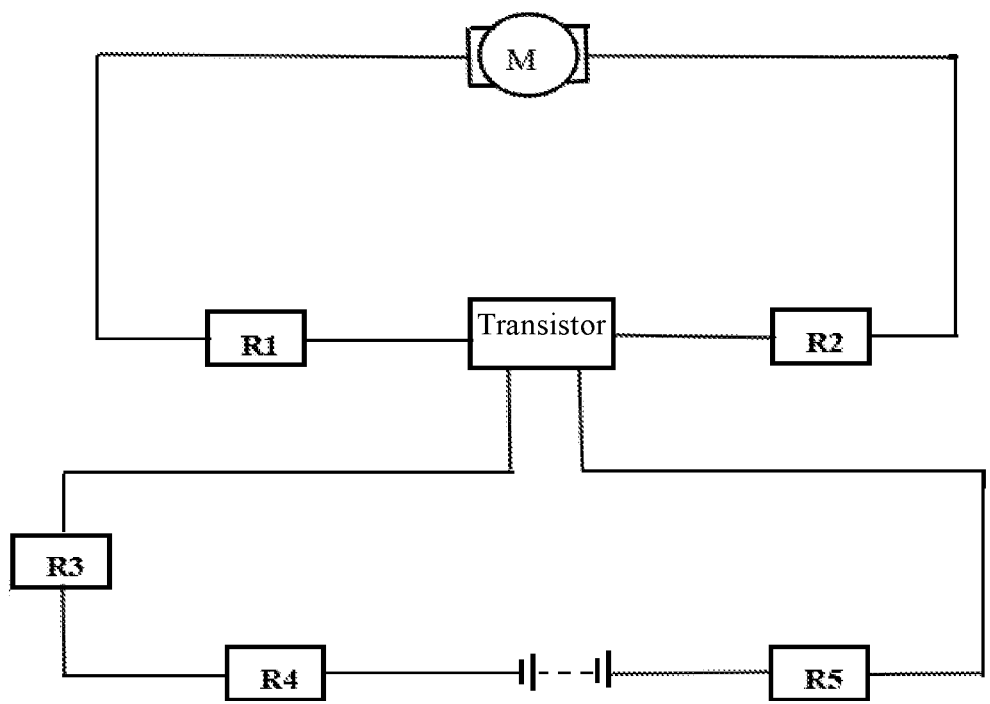
FIG. 1 is a schematic diagram of a traditional armature circuit in a battery type electric tool.

The present invention is further illustrated below in combination with embodiments shown in the drawings.

Figures 4A, 4B:
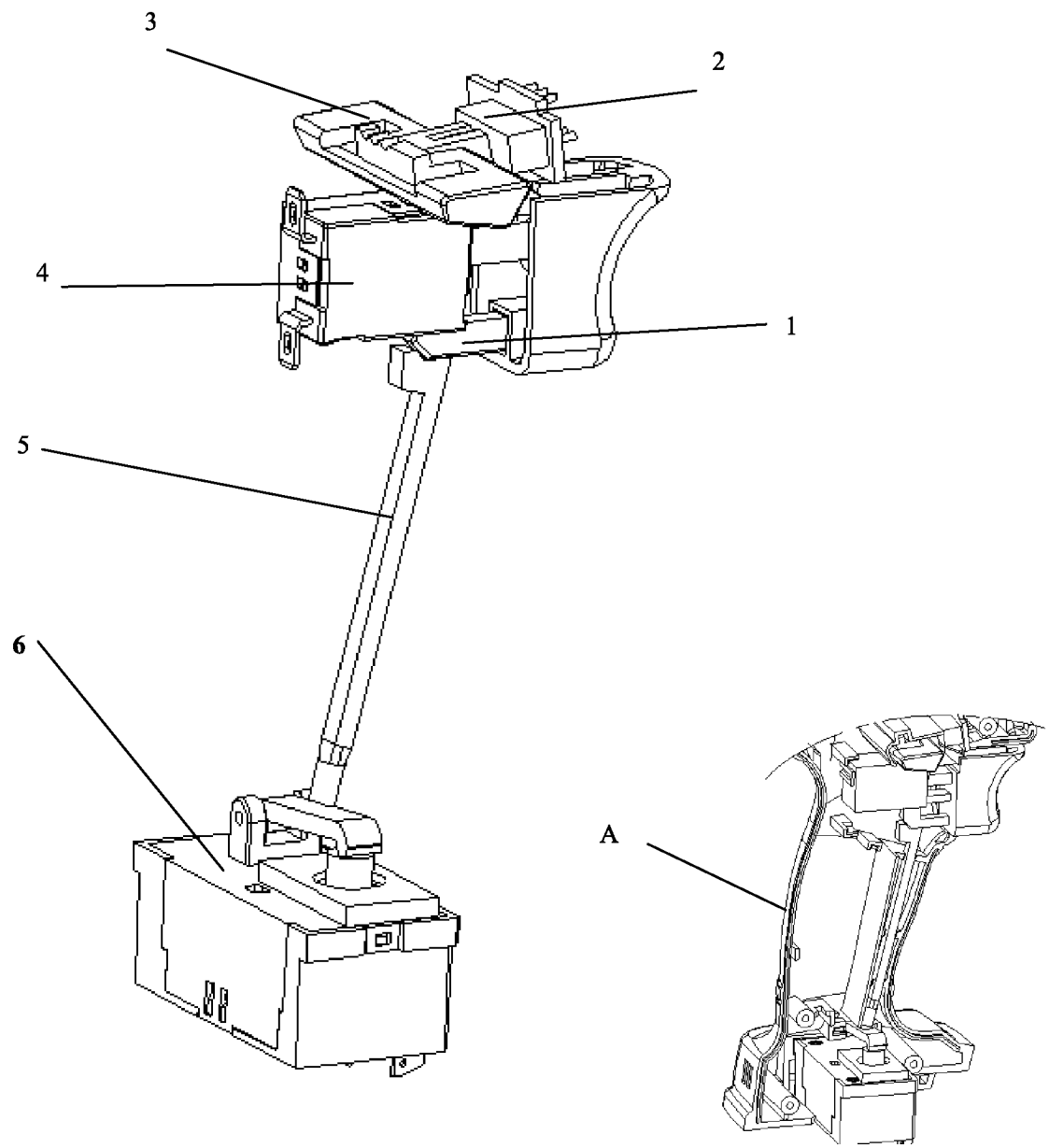
FIG. 4A is a three-dimensional schematic diagram of embodiment 1 and embodiment 2 of the present invention, wherein 1—trigger push rod, 2—reversing plate, 3—reversing rod, 4—variable resistance box, 5—upper pressing rod and 6—socket assembly.
FIG. 4B is a three-dimensional schematic diagram of a socket assembly mounted in a casing according to embodiment 1 and embodiment 2 of the present invention, wherein A is the casing.

For the drawings, it needs to be additionally illustrated that:

FIG. 4A is a three-dimensional schematic diagram of embodiments of the present invention, mainly relating to embodiment 1 and embodiment 2. In embodiment 1 and embodiment 2, the remaining parts are identical, except that internal structures of the socket assembly are different.

FIG. 5 to FIG. 20 mainly relate to embodiment 1, and show schematic diagrams of the internal structures of the socket assembly, assembling relationship among components, and individual component, wherein FIG. 6 to FIG. 11 are schematic diagrams of the internal structures of the ejection head bracket assembly, the assembling relationship among components, and individual component; FIG. 12 to FIG. 16 are schematic diagrams of the internal structures of the socket on-off function component, the assembling relationship among components, and individual component; and FIG. 17 to FIG. 20 are schematic diagrams of the assembling relationship among the ejection head bracket assembly, the socket on-off function component, the bracket spring, the socket base, the socket cover and other components.

Figure 5:
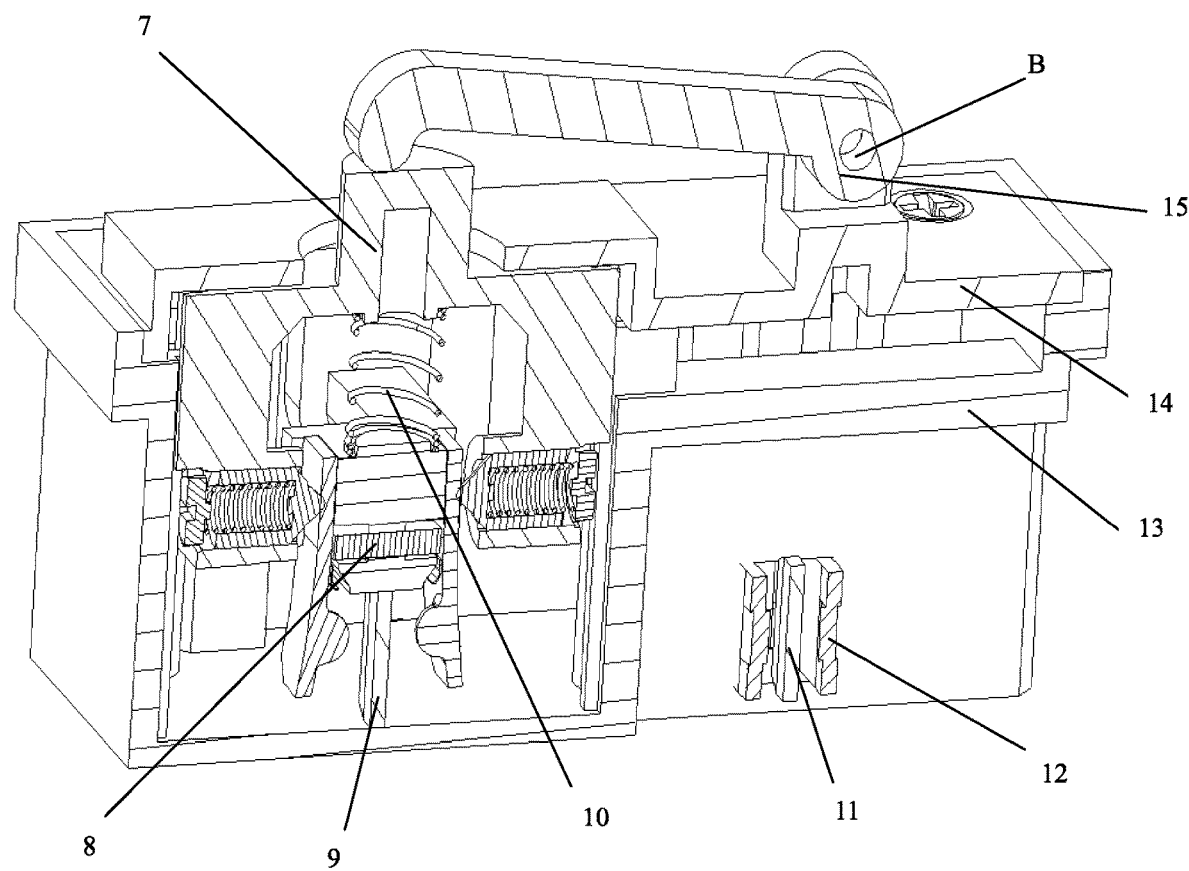
FIG. 5 is a cross-sectional schematic diagram of the socket assembly according to embodiment 1 of the present invention, wherein 7—ejection head bracket assembly, 8—socket on-off function component, 9—negative contact piece of the battery pack, 10—bracket spring, 11—positive contact piece of the battery pack, 12—elastic connecting clip, 13—socket base, 14—socket cover, 15—swing rod and B—metal pin.

FIG. 5 is a cross-sectional schematic diagram of a battery pack socket according to embodiment 1 of the present invention; the figure clearly shows that a positive contact piece of a battery pack and an elastic connecting clip are subjected to fixed elastic contact connection; a negative contact piece of the battery pack and a tilting contact piece bracket are subjected to tilting contact connection through two tilting contact pieces; and a battery assembly socket shown in the figure is in a disconnected state.

Figure 6:
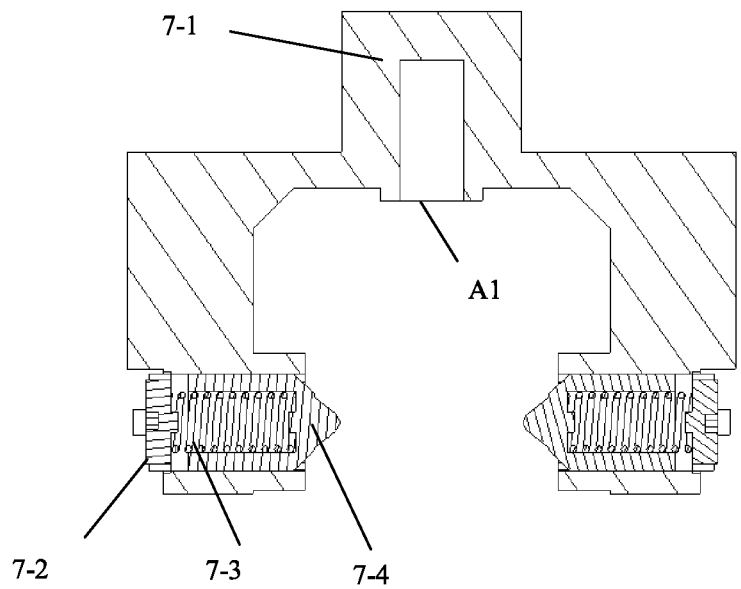
FIG. 6 is a cross-sectional schematic diagram of the ejection head bracket assembly.

FIG. 6 is a cross-sectional schematic diagram of the ejection head bracket assembly, and is composed of an ejection head bracket 7-1, ejection head covers 7-2, ejection head springs 7-3 and ejection heads 7-4; the figure clearly shows that the ejection heads and the ejection head springs are held on the ejection head bracket through the ejection head covers; and the ejection heads can move longitudinally under action of elastic force of the ejection head springs.

Figure 12:
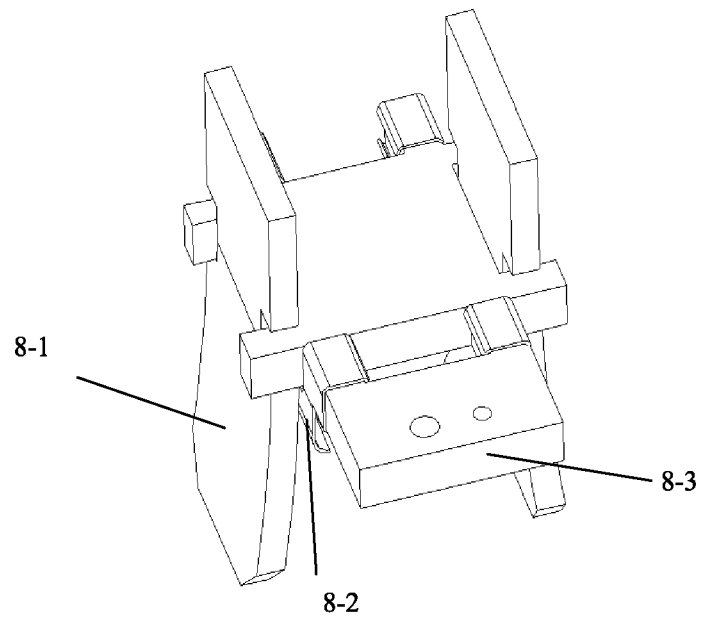
FIG. 12 is a schematic perspective view of the socket on-off function part.

FIG. 12 is a three-dimensional schematic diagram of the socket on-off function component, and is composed of tilting plates 8-1, auxiliary contact pieces 8-2 and a tilting contact bracket 8-3.

FIG. 21 to FIG. 29 mainly relate to embodiment 1 and embodiment 2, and show schematic diagrams of the assembling relationship among common components and individual component in embodiment 1 and embodiment 2.

FIG. 30 to FIG. 45 mainly relate to embodiment 2, and show schematic diagrams of the internal structures of the socket assembly, the assembling relationship among the components and individual component, wherein FIG. 31 to FIG. 36 show schematic diagrams of the internal structures of the ejection head bracket assembly, the assembling relationship among the components and individual component; FIG. 37 to FIG. 41 show schematic diagrams of the internal structures of the socket on-off function component, the assembling relationship among the components and individual component; and FIG. 42 to FIG. 45 show schematic diagrams of the assembling relationship among the ejection head bracket assembly, the socket on-off function component, the bracket spring, the socket base, the socket cover and other components.

Figure 30:
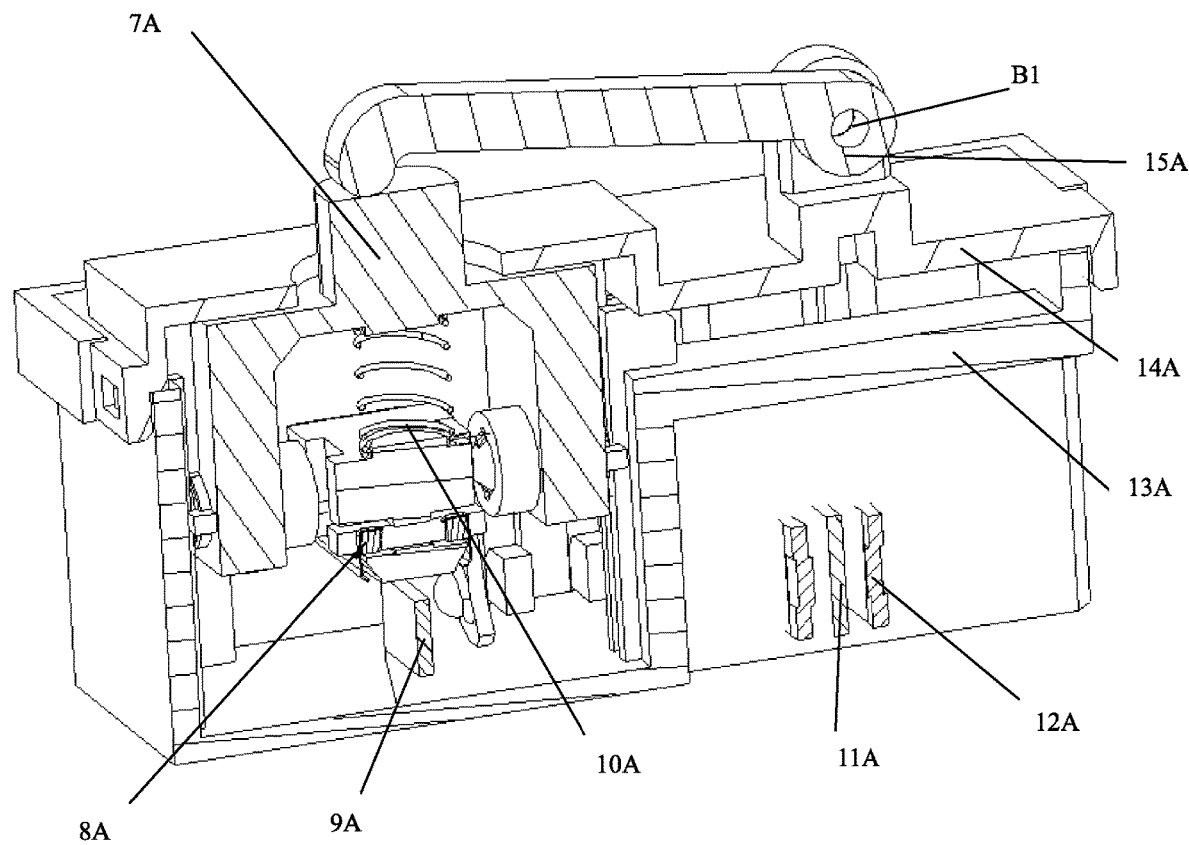
FIG. 30 is a cross-sectional schematic diagram of the socket according to embodiment 2 of the present invention, wherein 7A—ejection head bracket assembly, 8A—socket on-off function component, 9A—negative contact piece of the battery pack, 10A—bracket spring, 11A—positive contact piece of the battery pack, 12A—elastic connecting clip, 13A—socket base, 14A—socket cover, 15A—swing rod and B1—metal pin.

FIG. 30 is a cross-sectional schematic diagram of the battery pack socket according to embodiment 2 of the present invention; FIG. 4A and FIG. 30 are structural schematic diagrams of embodiment 2 of the present invention; the figures clearly show that the positive contact piece of the battery pack and the elastic connecting clip are subjected to fixed elastic contact connection; the negative contact piece of the battery pack and the tilting contact piece bracket are subjected to tilting contact connection through two tilting contact pieces; and the battery assembly socket shown in the figures is in a disconnected state.

Figure 31:
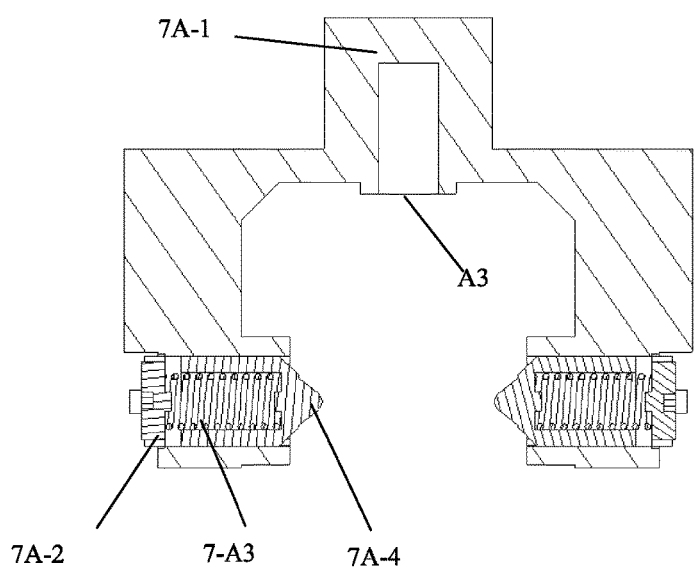
FIG. 31 is a cross-sectional schematic diagram of the ejection head bracket assembly.

FIG. 31 is a cross-sectional schematic diagram of the ejection head bracket assembly, and is composed of an ejection head bracket 7A-1, ejection head covers 7A-2, ejection head springs 7A-3 and ejection heads 7A-4; the figure clearly shows that the ejection heads and the ejection head springs are held on the ejection head bracket through the ejection head covers; and the ejection heads can move longitudinally under the action of the elastic force of the ejection head springs.

FIG. 37 is a three-dimensional schematic diagram of the socket on-off function component, and is composed of tilting plates 8A-1, auxiliary contact pieces 8A-2 and a tilting contact bracket 8A-3.

Figure 2:
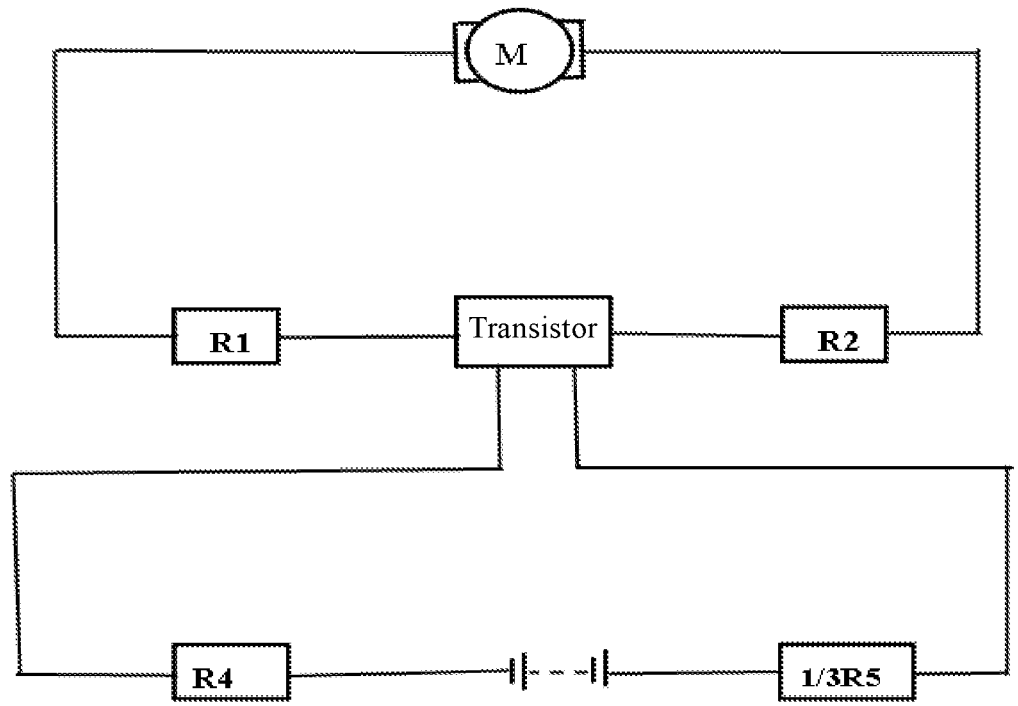
FIG. 2 is a schematic diagram of an armature circuit in the battery type electric tool according to the present invention.
Figure 3:
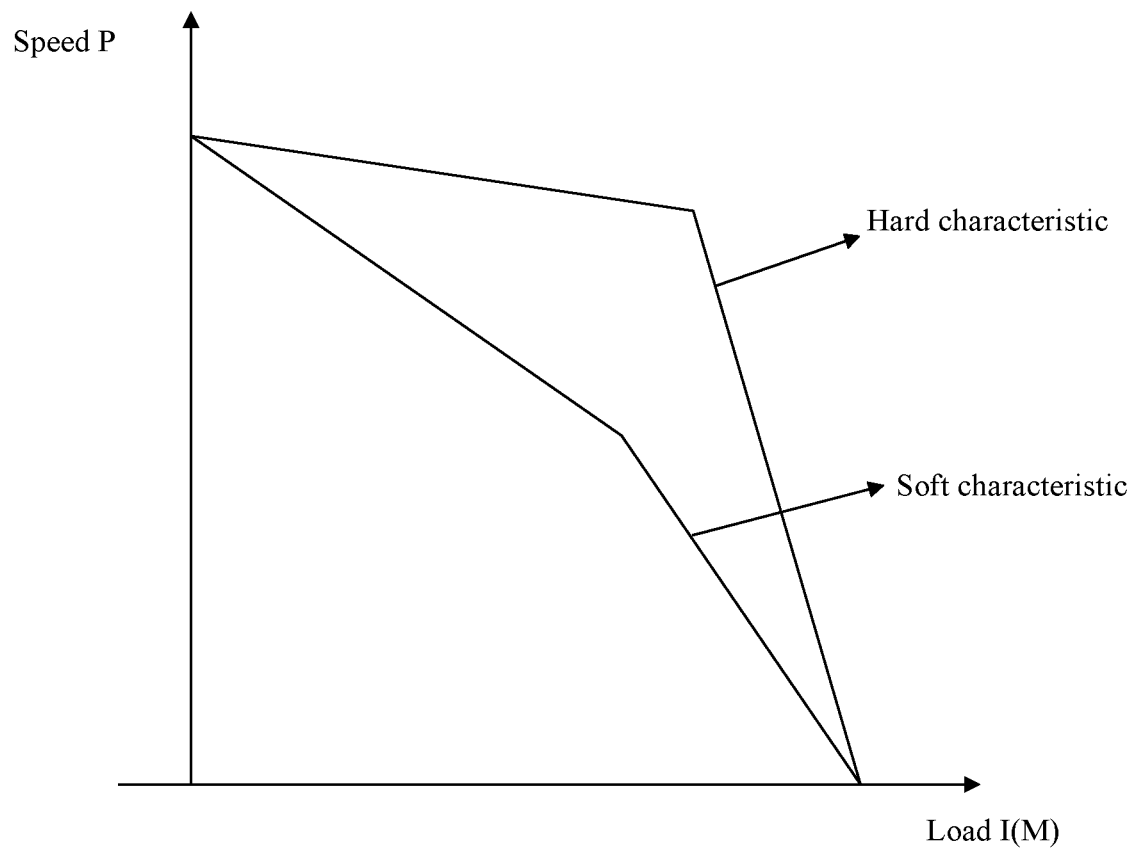
FIG. 3 is a schematic diagram of operating characteristics of a motor.

A schematic diagram of the armature circuit of the present invention is shown in FIG. 2; when a battery negative electrode switch is replaced with a double-sided socket capable of controlling on-off, the internal resistance R3 of an original switch is eliminated, two contact resistances of the negative electrode are connected in parallel, while the battery positive electrode is changed from double-sided single-point contact into double-sided three-point contact, and six contact resistances of the electrode are connected in parallel, the total resistance of the armature circuit (exclusive of the resistance of a motor) $R_{total}=R1+R2+R4+1/3R5=2R1+(1+1/3)R4$, and it can be seen that the total resistance of the armature circuit of the tool motor is greatly reduced; since the battery type electric tool is characterized by low voltage and high current, if the greater the value of $R_{total}$ is, the softer the operating characteristics of the motor are, then the operating efficiency is rapidly reduced with the increase of load; as shown in FIG. 3, since the resistance of the armature circuit is greatly reduced in the present invention, the operating efficiency of the motor is greatly increased.

Embodiment 1

Figure 18:
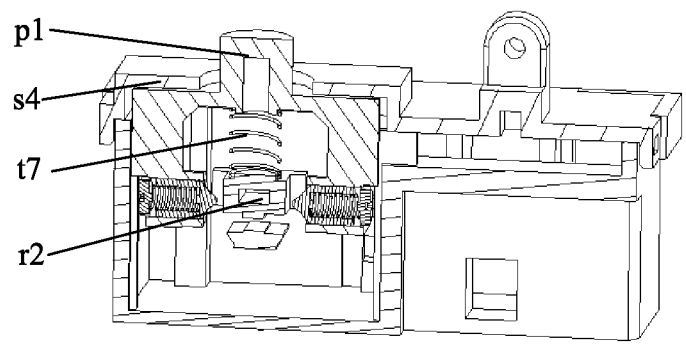
FIG. 18 is a cross-sectional schematic diagram of the relationship that the ejection head bracket assembly is held between the socket base and the socket cover under action of elastic force of the bracket spring, wherein p1—ejection head bracket assembly, s4—socket cover, t7—bracket spring and r1—socket base.
Figure 19:
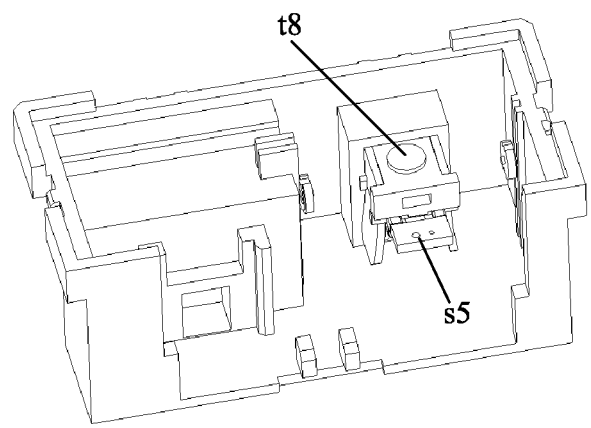
FIG. 19 is a schematic perspective view showing that the socket on-off function component is fixed on the socket base, wherein s5—socket on-off function component and t8—socket base.

FIG. 4A to FIG. 29 show a first embodiment of the present invention. As shown in FIG. 5, the socket assembly according to the present embodiment comprises 7—an ejection head bracket assembly, 8—a socket on-off function component, 10—a bracket spring, 12—an elastic connecting clip, 13—a socket base, 14—a socket cover, 15—a swing rod and B—a metal pin; the socket on-off function component is fixed on a plug pin base, as shown in FIG. 19; the ejection head bracket assembly is held between the plug pin base and the socket cover under action of elastic force of the bracket spring, as shown in FIG. 18; and the elastic connecting clip is fixed to the socket base and the socket cover, as shown in FIG. 21.

Figure 20:
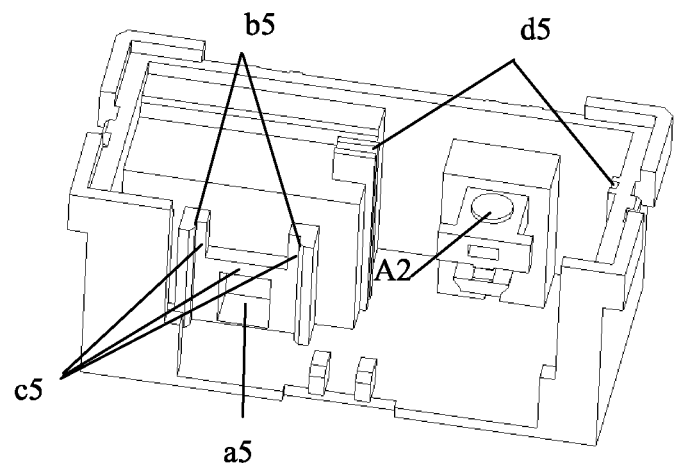
FIG. 20 is a schematic perspective view of the socket base.
Figure 21:
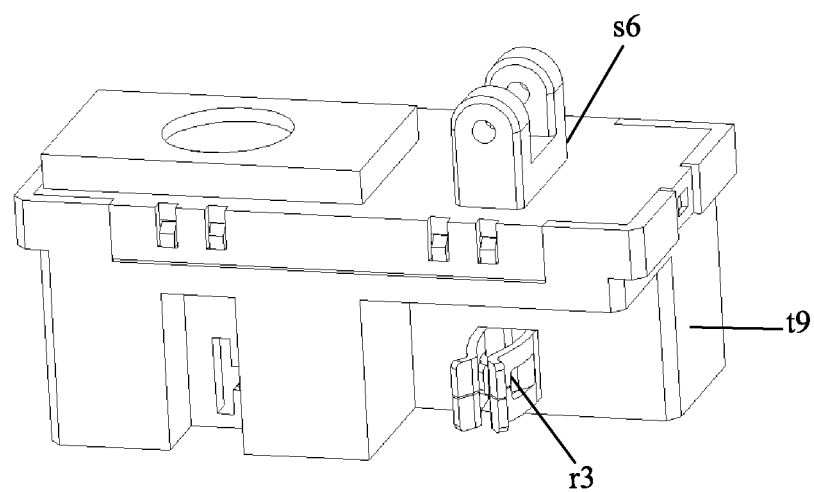
FIG. 21 is a schematic perspective view of an elastic connecting clip fixing between the socket base and the socket cover, wherein r3—elastic connecting clip, s6—socket cover and t9—socket base.
Figure 25:
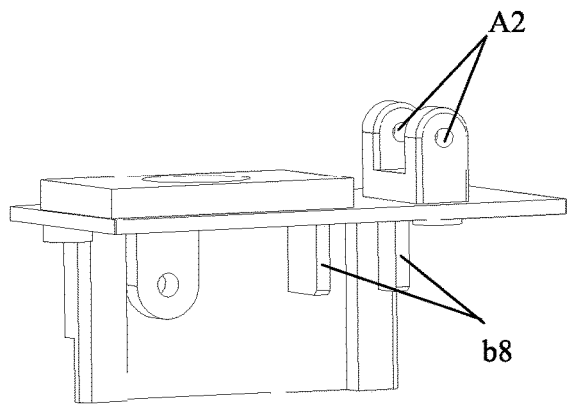
FIG. 25 is a schematic perspective view of the socket cover.
Figures 26A, 26B:
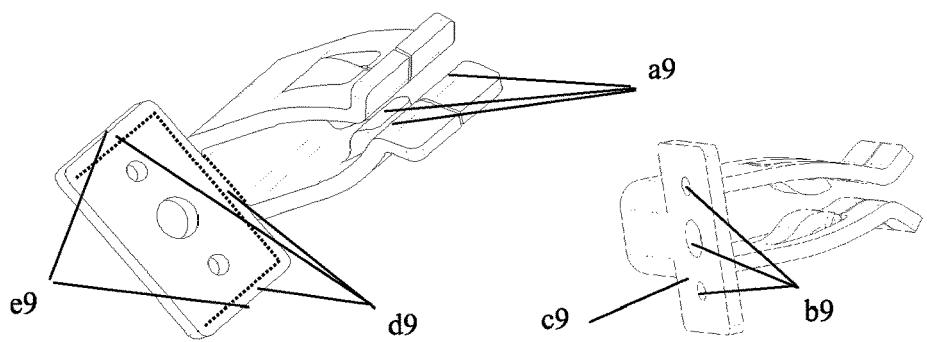
FIG. 26A is a first schematic perspective view of the elastic connecting clip.
FIG. 26B is a second schematic perspective view of the elastic connecting clip.
Figures 27, 28:
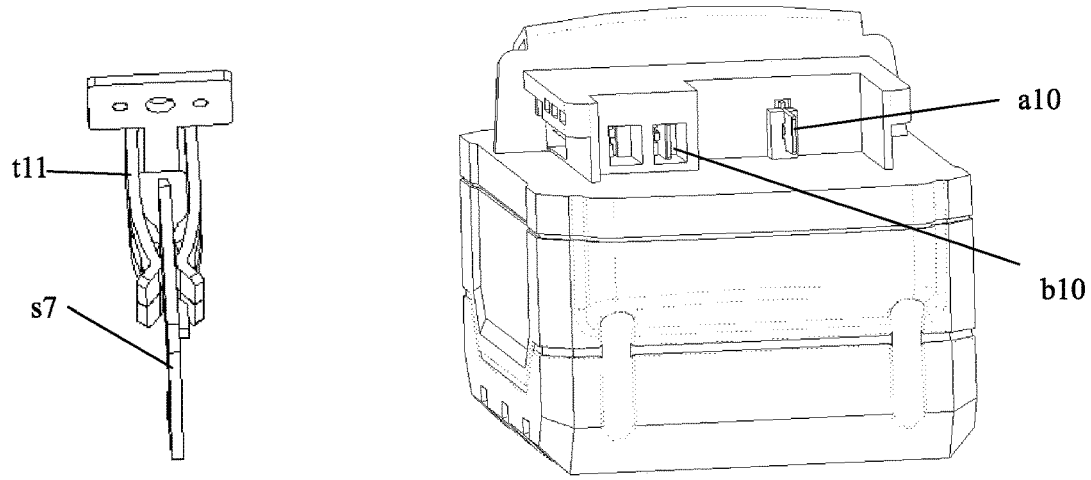
FIG. 27 schematically shows the contact between the elastic connecting clip and the positive contact piece of the battery pack, wherein t11—elastic connecting clip and s7—positive contact piece of the battery pack.
FIG. 28 schematically shows that the positive contact piece bracket and a negative contact piece bracket of the battery pack are fixed in the battery pack.

The detailed implementation manner is that in a state shown in FIG. 5, when a battery pack is plugged in a battery pack socket, six elastic contact points on both sides of the elastic connecting clip shown by a9 in FIG. 26A and a positive contact piece of the battery pack shown by b10 in FIG. 28 are connected through a plurality of elastic contacts; as shown in FIG. 27, the elastic connecting clip receives current from a positive electrode of the battery pack and connects and transmits the current to a PCB end of a control system and input ends (drains) of three groups of high power field effect transistors connected to one end of a motor in series through an electric wire in a position b9 shown in FIG. 26B; the elastic connecting clip shown in FIG. 26A and FIG. 26B is fixed on the socket base shown in FIG. 20 and the socket cover shown in FIG. 25; as shown in FIG. 21, part of a plane shown by d9 in FIG. 26A is abutted on the plane shown by a5 in FIG. 20; two end surfaces shown by e9 in FIG. 26A are clamped between two fixing ribs shown by b5 in FIG. 20; a position b8 of the socket cover shown in FIG. 25 is pressed on a surface shown by c9 in FIG. 26B; and however, as shown in FIG. 5, the two tilting contact pieces are disconnected from the negative contact piece of the battery pack, and a circuit is in a disconnected state at this moment.

Figure 11:
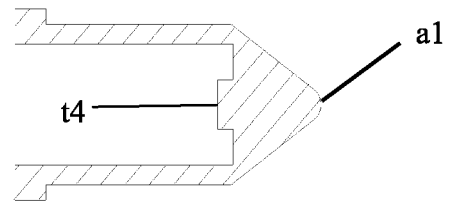
FIG. 11 is a cross-sectional schematic diagram of an ejection head.
Figure 13:
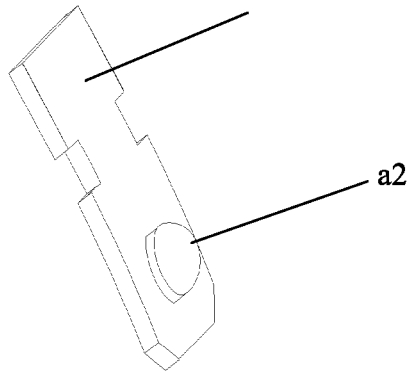
FIG. 13 is a schematic perspective view of a tilting contact piece.
Figure 14:
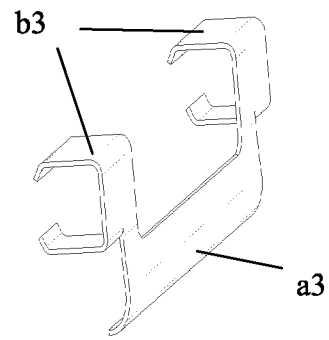
FIG. 14 is a schematic perspective view of an auxiliary contact piece.
Figure 15:
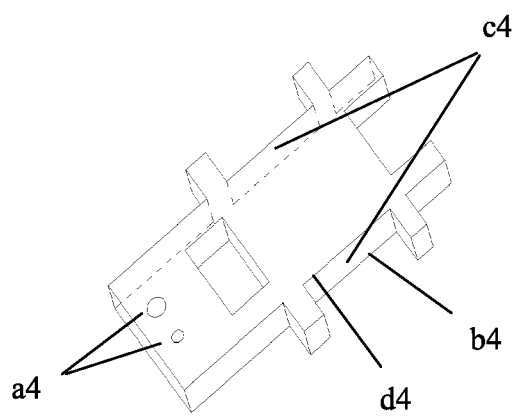
FIG. 15 is a schematic perspective view of a tilting contact piece bracket.
Figure 16:
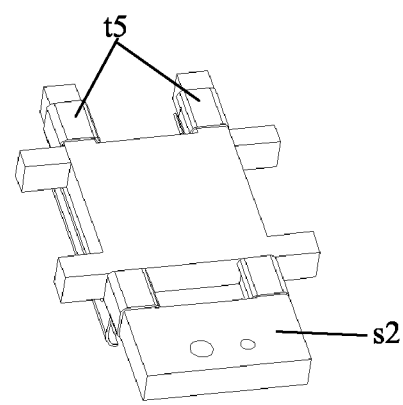
FIG. 16 is a schematic perspective view showing that the auxiliary contact piece is fixed on the tilting contact piece bracket. Wherein, t5—auxiliary contact piece and s2—tilting contact piece bracket.
Figure 22:
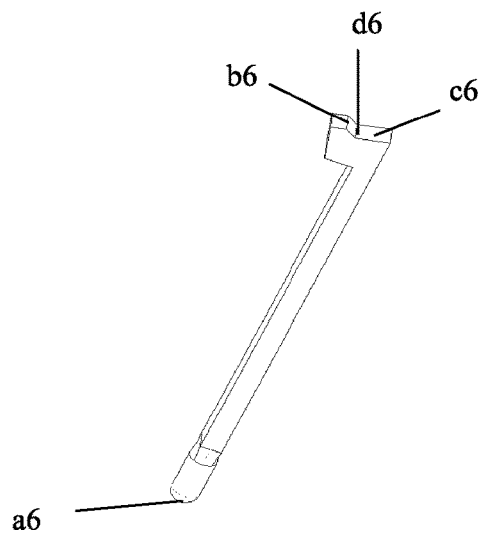
FIG. 22 is a schematic perspective view of an upper pressing rod.
Figure 23:
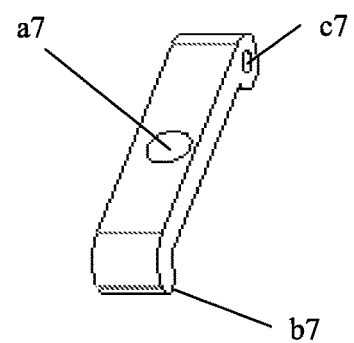
FIG. 23 is a schematic perspective view of a swing rod.
Figure 29:
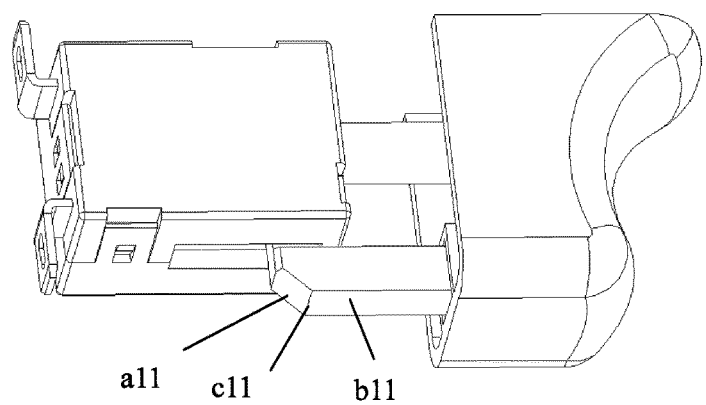
FIG. 29 is a schematic perspective view of a trigger and a variable resistance box.

When a trigger push rod moves inwards, an inclined surface a11 of a trigger shown in FIG. 29 presses an inclined surface c6 of an upper pressing rod shown in FIG. 22 so that the upper pressing rod rapidly moves down; but when the inclined surface a11 of the trigger shown in FIG. 29 passes over the inclined surface c6 shown in FIG. 22, and a lower plane b11 of the trigger shown in FIG. 29 is in contact with an upper plane of the upper pressing rod shown in FIG. 22, the position of the upper pressing rod keeps unchanged; an end a6 of the upper pressing rod shown in FIG. 22 rapidly ejects a position a7 of a swing rod shown in FIG. 23 and swings down about a fulcrum A2 shown in FIG. 25; under the action of an end b7 of the swing rod shown in FIG. 23, the ejection head bracket assembly rapidly moves down; when tip end part at position a1 of ejection heads shown in FIG. 11 on the ejection head bracket moves to pass over a boundary line b4, shown in FIG. 15, of thickness of a tilting contact piece bracket facing one side of the tilting contact piece bracket in a direction of contact points, the ejection heads rapidly reverse the two tilting contact pieces to tilt to the negative contact piece of the battery pack under the action of ejection head springs; two contact points a2 shown in FIG. 13 clamp the negative contact piece of the battery pack; the two contact points a2 of the tilting contact pieces shown in FIG. 13 are connected with the negative contact piece of the battery pack shown by a10 in FIG. 28, to receive the current from the negative electrode of the battery pack; when the two tilting contact pieces pivotally tilt to the negative contact piece of the battery pack, arc surface parts a3 of auxiliary contact pieces shown in FIG. 14 may be pressed first; this part is an arc surface elastomer; the two tilting contact pieces and the two auxiliary contact pieces are subjected to elastic contact connection, while parts b3 of both ends of the two auxiliary contact pieces shown in FIG. 14 are fixed on the tilting contact piece bracket; as shown in FIG. 16, in this way, the current received by the tilting contact pieces is transmitted to the tilting contact piece bracket through two ways including tilting positions of the tilting contact pieces and the tilting contact piece bracket as well as the auxiliary contact pieces; the tilting contact piece bracket connects and transmits the current received by the tilting contact piece bracket to a negative end of the PCB of the control system and output ends (sources) of the three groups of high power field effect transistors connected to the other end of the motor in series through an electric wire in a position a4 shown in FIG. 15; the circuit is turned on at this moment; and the control system guides the motor to start operation.

When the trigger push rod moves outwards under the action of the elastic force of the springs, and the trigger push rod moves to a boundary line c11 shown in FIG. 29 over a boundary line d6 shown in FIG. 22, the ejection head bracket assembly has a space for upward movement; the ejection head bracket assembly 23 ejects the end b7 of the swing rod shown in FIG. 23 to pivotally swing up about a fulcrum A2 shown in FIG. 25 under the action of the elastic force of the ejection head springs; the position a7 of the swing rod shown in FIG. 23 ejects a position a6 of the upper pressing rod shown in FIG. 22, so that the upper pressing rod is moved up and automatically reset; when the tip end part at the position a1 of the ejection heads shown in FIG. 11 moves to pass over a boundary line d4, shown in FIG. 15, of thickness of the tilting contact piece bracket opposite to one side of the tilting contact piece bracket in the direction of the contact points, the two tilting contact pieces tilt to a central direction shown by b5 in FIG. 20, so that the two tilting contact pieces are rapidly disconnected from the negative contact piece of the battery pack; the circuit is automatically turned off at this moment; and the motor stops operating.

Figure 7:
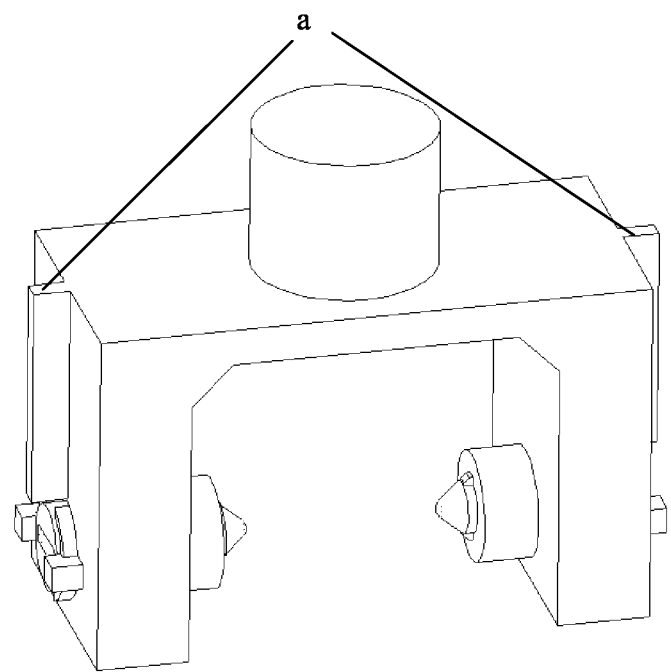
FIG. 7 is a schematic perspective view of the ejection head bracket assembly.
Figure 8:
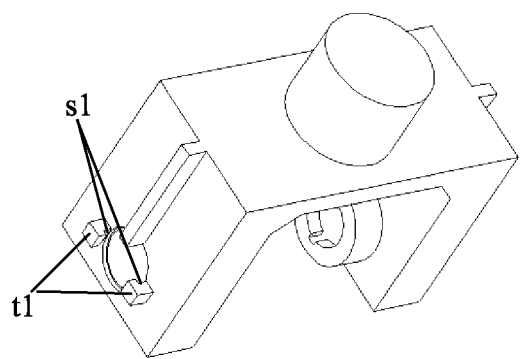
FIG. 8 is a schematic perspective view of an ejection head bracket.
Figure 9:
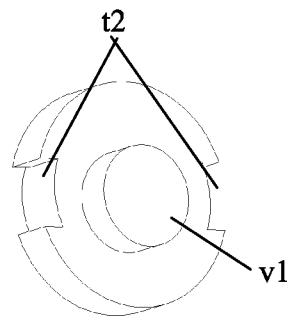
FIG. 9 is a schematic perspective view of an ejection head cover.
Figure 10:
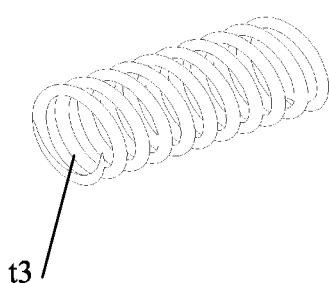
FIG. 10 is a schematic perspective view of an ejection head spring.

The ejection head bracket assembly, as shown in FIG. 6 and FIG. 7, is composed of an ejection head bracket shown in FIG. 8, two ejection head covers shown in FIG. 9, two ejection head springs shown in FIG. 10 and two ejection heads shown in FIG. 11; the ejection head springs are held between the ejection head covers and the ejection heads; one end of inner holes t3 in one end of the ejection head springs shown in FIG. 10 is held on outer circles of convex plates t4 shown in FIG. 11; the inner holes t3 in the other end of the ejection head springs shown in FIG. 10 are held on the outer circles of convex plates v1 shown in FIG. 9; after the two convex plates v1 shown in FIG. 8 are mounted in two grooves t2 in the ejection head covers shown in FIG. 9, and a certain angle is selected for the ejection head covers, the ejection head covers are held in the two grooves s1 shown in FIG. 8; the ejection head bracket assembly is held between the socket base and the socket cover through the ejection head bracket under the action of the elastic force of the bracket spring; and as shown in FIG. 18, under the action of the swing rod and the bracket spring, guide ribs on both sides of the ejection head bracket shown by a in FIG. 7 can freely reciprocate up and down along corresponding guide grooves in the socket base shown by d5 in FIG. 20. The ejection heads are held on the ejection head bracket; under the action of the elastic force of the ejection head springs, pressure is applied outward on the ejection head bracket; meanwhile, under the action of the ejection head springs, the tip end part of the ejection heads is always pressed on outer side surfaces of the two tilting contact pieces; when the ejection head bracket moves up and down, the tilting state of the two tilting contact pieces can be rapidly reversed; when the ejection head assembly moves down, and the tip end part at the position a1 of the ejection heads shown in FIG. 11 moves to pass over a boundary line b4, shown in FIG. 15, of thickness of the tilting contact piece bracket facing one side of the tilting contact piece bracket in the direction of the contact points, the ejection heads rapidly reverse the two tilting contact pieces to tilt to the negative contact piece of the battery pack under the action of the ejection head springs, so as to rapidly receive the current from the negative electrode of the battery pack; when the ejection head assembly moves up, and the tip end part at the position a1 of the ejection heads shown in FIG. 11 moves to pass over a boundary line d4, shown in FIG. 15, of thickness of the tilting contact piece bracket opposite to one side of the tilting contact piece bracket in the direction of the contact points, the two tilting contact pieces tilt to the central direction shown by b5 in FIG. 20, so that the contact points of the tilting contact pieces are rapidly disconnected from the negative contact piece of the battery pack, thereby playing a role of rapidly disconnecting the current from the negative electrode of the battery pack.

Figure 24:
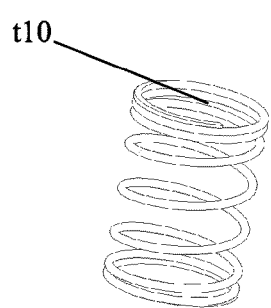
FIG. 24 is a schematic perspective view of an ejection head frame spring.

The upper pressing rod, as shown in FIG. 4 and FIG. 24, is held on a tool casing and the swing rod and can move up and down; the end a6 of the upper pressing rod shown in FIG. 22 ejects the position a7 of the swing rod shown in FIG. 23; when the trigger push rod moves inwards under the action of external force, the inclined surface a11 shown in FIG. 29 presses the inclined surface c6 of the upper pressing rod shown in FIG. 22 so that the upper pressing rod rapidly moves down; but when a boundary line c11 at a lower end of the inclined surface a11 of the trigger push rod shown in FIG. 29 passes over a boundary line d6 at an upper end of the inclined surface c6 shown in FIG. 22, and the lower plane b11 of the trigger push rod shown in FIG. 29 is in contact with the upper plane b6 of the upper pressing rod shown in FIG. 22, the position of the upper pressing rod keeps unchanged; but when the trigger push rod moves outwards under the action of the elastic force of the springs, and the trigger push rod moves to the boundary line c11 shown in FIG. 29 over the boundary line d6 shown in FIG. 22, the upper pressing rod can be rapidly and automatically reset under the action of upward elastic force of the ejection head bracket assembly.

The swing rod, as shown in FIG. 5 and FIG. 23, has the end b7 shown in FIG. 23 ejected on a plane of a bulging part at the upper end of the ejection head bracket, and has a hole c7 shown in FIG. 23 held on two fixing ribs at a hole A2 of the socket cover shown in FIG. 25 through the metal pin, and can pivotally swing about the fulcrum A2 shown in FIG. 25; when the trigger push rod moves inwards under the action of the external force, the upper pressing rod moves down, the end a6 of the upper pressing rod shown in FIG. 22 rapidly presses the position a7 of the swing rod shown in FIG. 23 to pivotally swing down about the fulcrum A2 shown in FIG. 25; and under the action of the end b7 of the swing rod shown in FIG. 23, the ejection head bracket assembly rapidly moves down. When the trigger push rod moves outwards under the action of the elastic force of the springs, and the trigger push rod moves to the boundary line c11 shown in FIG. 29 to pass over the boundary line d6 shown in FIG. 22, the ejection head bracket assembly has a space for upward movement; and when the elastic force of the ejection head springs is greater than the pressure of the upper pressing rod, the ejection head bracket assembly ejects the end b7 of the swing rod shown in FIG. 23 to pivotally swing up about the fulcrum A2 shown in FIG. 25 under the action of the elastic force of the ejection head springs, so that the swing rod is automatically reset. Through the action of the swing rod, a stroke of the ejection head bracket can be increased doubly, so that the battery pack socket achieves a rapid on-off function.

Figure 17:
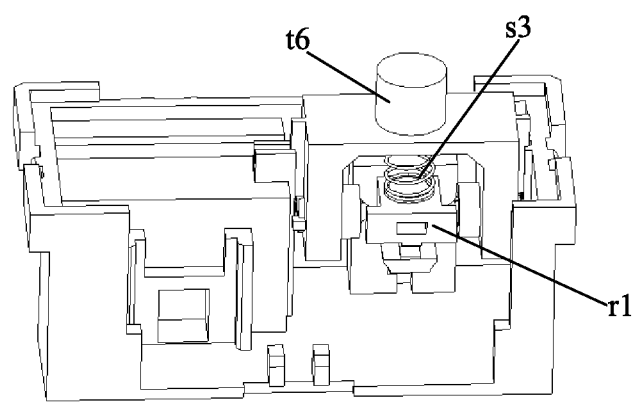
FIG. 17 is a schematic perspective view showing a relationship among the bracket spring, the ejection head bracket assembly and the socket base, wherein t6—ejection head bracket assembly, s3—bracket spring and r1—socket base.

The bracket spring, as shown in FIG. 24, is held between a position A1 of the ejection head bracket assembly shown in FIG. 6 and a convex plate A2 of the socket base shown in FIG. 20, and can eject the ejection head bracket assembly to move up as shown in FIG. 17, so that the two tilting contact pieces are rapidly disconnected from the negative contact piece of the battery pack.

The socket on-off function component, as shown in FIG. 12, is composed of two tilting contact pieces, two auxiliary contact pieces and one tilting contact piece bracket, and is fixed on the socket base shown in FIG. 20 through the tilting contact piece bracket; as shown in FIG. 19, when outer side surfaces of the two tilting plates are under the action of the pressure of the ejection head springs, and the ejection heads move up and down together with the ejection head bracket, the tilting plates can rapidly clamp or separate from the negative connecting piece of the battery pack, so that the battery pack socket generates the on-off function.

Embodiment 2

Figure 43:
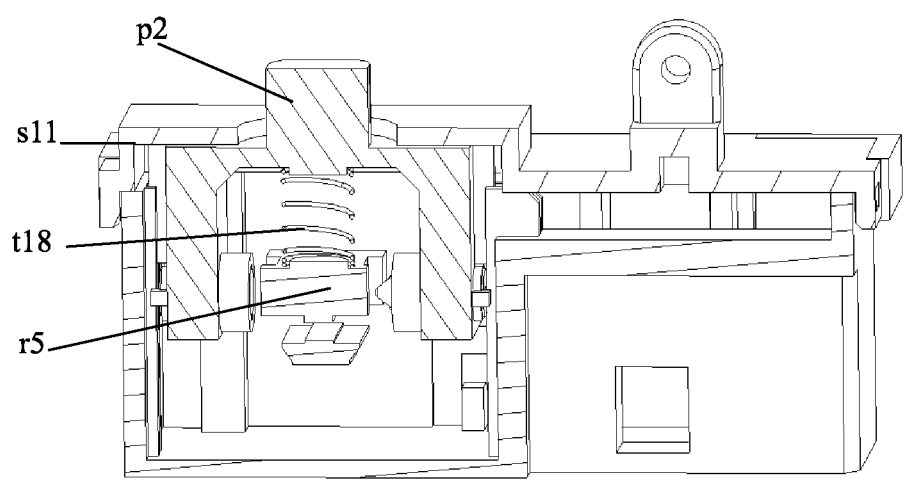
FIG. 43 is a cross-sectional schematic diagram of the relationship that the ejection head bracket assembly is held between the socket base and the socket cover under the action of the elastic force of the bracket spring, wherein p2—ejection head bracket assembly, s11—socket cover, t18—bracket spring and r5—socket base.
Figure 44:
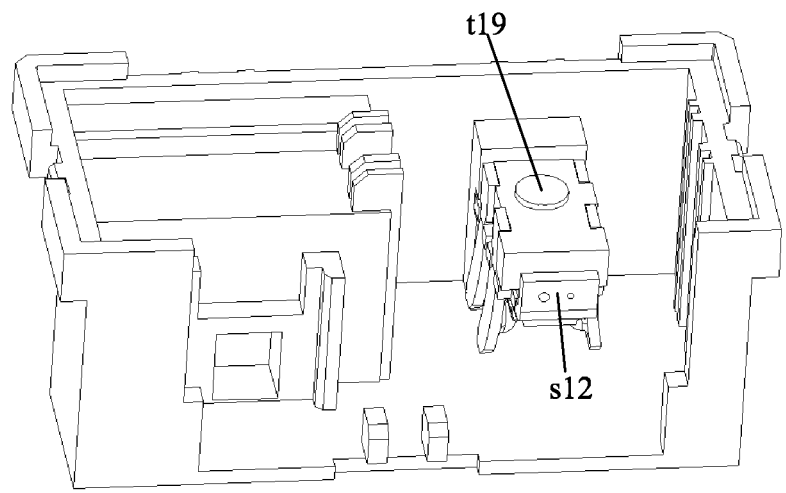
FIG. 44 is a schematic perspective view of the socket on-off function component fixing on the socket base, wherein s12—socket on-off function component and t19—socket base.

FIG. 4A, FIG. 4B and FIG. 21 to FIG. 45 show a second embodiment of the present invention. As shown in FIG. 30, the socket assembly according to the present embodiment comprises 7A—an ejection head bracket assembly, 8A—a socket on-off function component, 10A—a bracket spring, 12A—an elastic connecting clip, 13A—a socket base, 14A—a socket cover, 15A—a swing rod and B1—a metal pin; the socket on-off function component is fixed on a plug pin base, as shown in FIG. 44; the ejection head bracket assembly is held between the plug pin base and the socket cover under the action of elastic force of the bracket spring, as shown in FIG. 43; and the elastic connecting clip is fixed to the socket base and the socket cover, as shown in FIG. 21.

Figure 45:
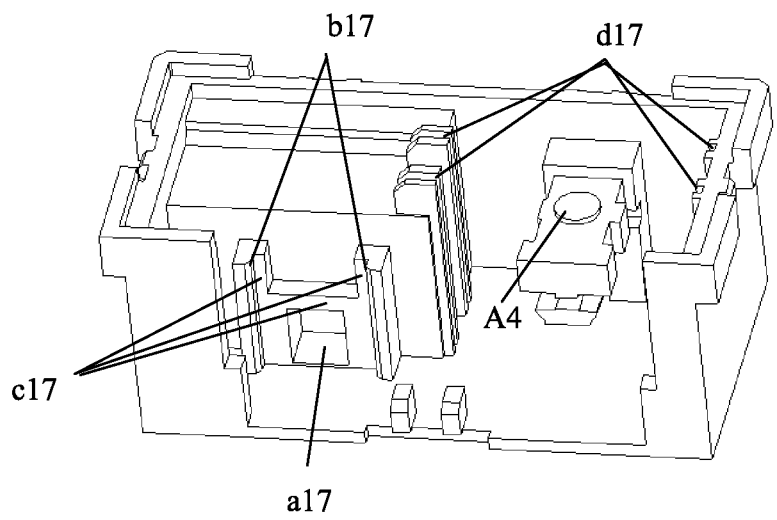
FIG. 45 is a three-dimensional schematic diagram of the socket base.
Figure 46:
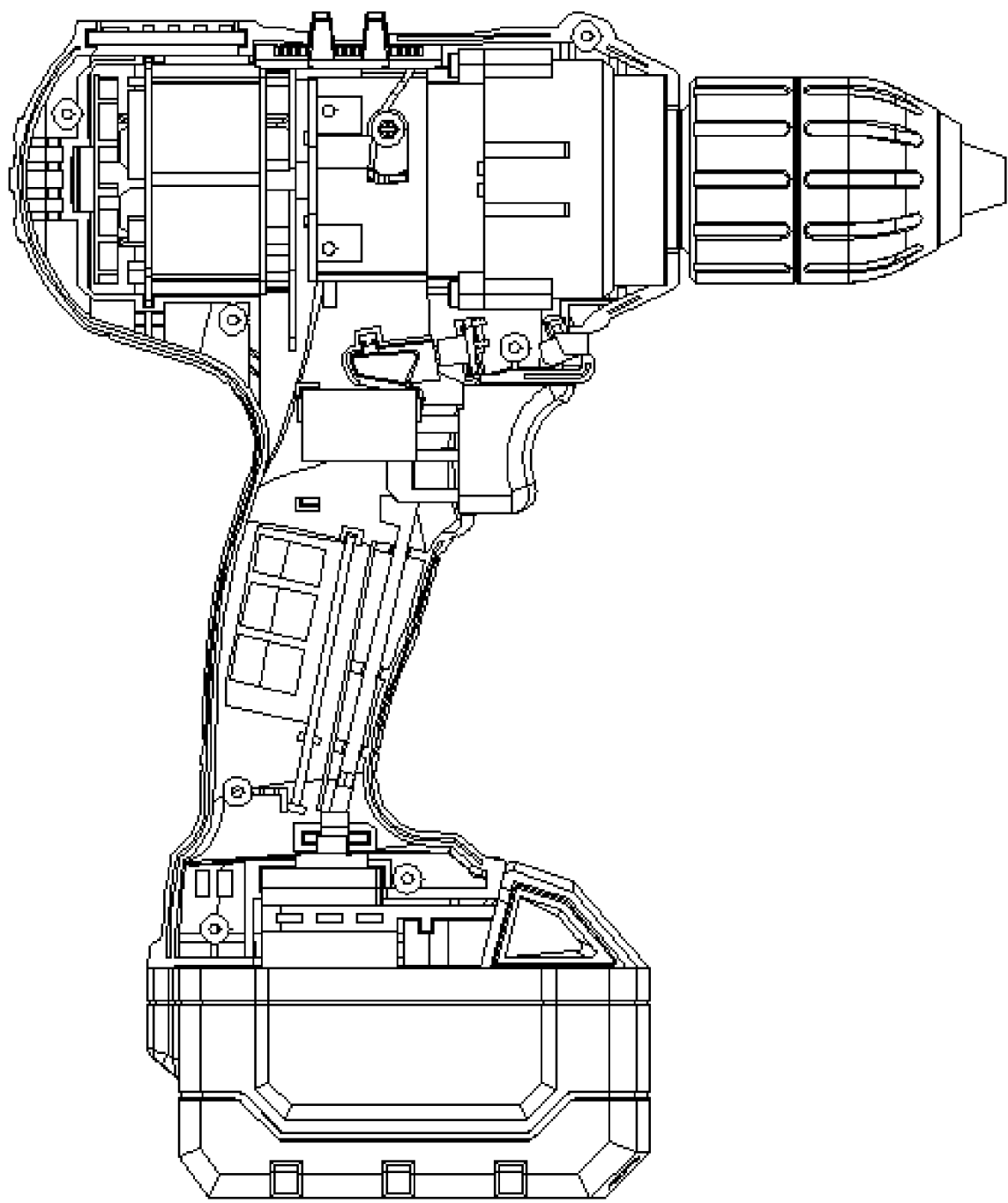
FIG. 46 is a planar schematic diagram of a battery packet socket with an on-off function used in a battery type electric drill.

The detailed implementation manner is that in a state shown in FIG. 30, when the battery pack is plugged in the battery pack socket, six elastic contact points on both sides of the elastic connecting clip shown by a9 in FIG. 26A and a positive contact piece of the battery pack shown by b10 in FIG. 28 are connected through a plurality of elastic contacts; as shown in FIG. 27, the elastic connecting clip receives current from the positive electrode of the battery pack and connects and transmits the current to a PCB end of a control system and input ends (drains) of three groups of high power field effect transistors connected to one end of a motor in series through an electric wire in a position b9 shown in FIG. 26B; the elastic connecting clip shown in FIG. 26A and FIG. 26B is fixed on the socket base shown in FIG. 45 and the socket cover shown in FIG. 25; as shown in FIG. 21, part of a plane shown by d9 in FIG. 26A is abutted on the plane shown by a17 in FIG. 45; two end surfaces shown by e9 in FIG. 26A are clamped between two fixing ribs shown by b17 in FIG. 45; a position b8 of the socket cover shown in FIG. 25 is pressed on a surface shown by c9 in FIG. 26B; and however, as shown in FIG. 30, the two tilting contact pieces are disconnected from the negative contact piece of the battery pack, and a circuit is in a disconnected state at this moment.

Figure 36:
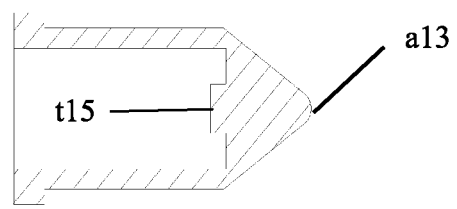
FIG. 36 is a cross-sectional schematic diagram of the ejection head.

When the trigger push rod moves inwards, an inclined surface a11 of a trigger shown in FIG. 29 presses an inclined surface c6 of an upper pressing rod shown in FIG. 22 so that the upper pressing rod rapidly moves down; but when the inclined surface a11 of the trigger shown in FIG. 29 passes over the inclined surface c6 shown in FIG. 22, and a lower plane b11 of the trigger shown in FIG. 29 is in contact with an upper plane of the upper pressing rod shown in FIG. 22, the position of the upper pressing rod keeps unchanged; an end a6 of the upper pressing rod shown in FIG. 22 rapidly ejects a position a7 of a swing rod shown in FIG. 23 to swing down about a fulcrum A2 shown in FIG. 25; under the action of an end b7 of the swing rod shown in FIG. 23, the ejection head bracket assembly rapidly moves down; when the tip end part at position a13 of ejection heads shown in FIG. 36 on the ejection head bracket moves to pass over a boundary line b16, shown in FIG. 40, of thickness of a tilting contact piece bracket facing one side of the tilting contact piece bracket in a direction of contact points, the ejection heads rapidly reverse the four tilting contact pieces to tilt to the negative contact piece of the battery pack under the action of ejection head springs; four contact points a14 shown in FIG. 38 clamp the negative contact piece of the battery pack; the four contact points a14 of the tilting contact pieces shown in FIG. 38 are connected with the negative contact piece of the battery pack shown by a11) in FIG. 28, to receive the current from the negative electrode of the battery pack; when the four tilting contact pieces pivotally tilt to the negative contact piece of the battery pack, arc surface parts a15 of two auxiliary contact pieces shown in FIG. 39 may be pressed first; this part is an arc surface elastomer; the four tilting contact pieces and the two auxiliary contact pieces are subjected to elastic contact connection, while three parts b15 of the two auxiliary contact pieces shown in FIG. 39 are fixed on the tilting contact piece bracket; as shown in FIG. 41, in this way, the current received by the tilting contact pieces is transmitted to the tilting contact piece bracket through two ways including tilting of the four tilting contact pieces and the tilting contact piece bracket as well as the auxiliary contact pieces; the tilting contact piece bracket connects and transmits the current received by the tilting contact piece bracket to a negative end of the PCB of the control system and output ends (sources) of the three groups of high power field effect transistors connected to the other end of the motor in series through an electric wire in a position a16 shown in FIG. 40; the circuit is turned on at this moment; and the control system guides the motor to start to operate.

When the trigger push rod moves outwards under the action of the elastic force of the springs, and the trigger push rod moves to a boundary line c11 shown in FIG. 29 to pass over a boundary line d6 shown in FIG. 22, the ejection head bracket assembly has a space for upward movement; the ejection head bracket assembly ejects the end b7 of the swing rod shown in FIG. 23 to pivotally swing up about a fulcrum A2 shown in FIG. 25 under the action of the elastic force of the ejection head springs; the position a7 of the swing rod shown in FIG. 23 ejects a position a6 of the upper pressing rod shown in FIG. 22, so that the upper pressing rod is moved up and automatically reset; when the tip end part at the position a13 of the ejection heads shown in FIG. 36 moves to pass over a boundary line d16, shown in FIG. 40, of thickness of the tilting contact piece bracket opposite to one side of the tilting contact piece bracket in the direction of the contact points, the four tilting contact pieces tilt to a central direction shown by b17 in FIG. 45, so that the four tilting contact pieces are rapidly disconnected from the negative contact piece of the battery pack; the circuit is automatically turned off at this moment; and the motor stops operating.

Figure 32:
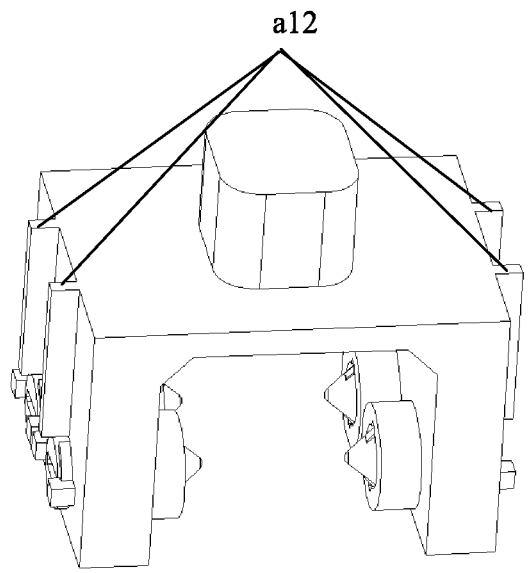
FIG. 32 is a schematic perspective view of the ejection head bracket assembly.
Figure 33:
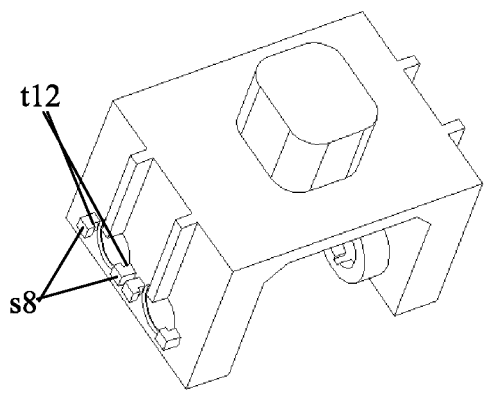
FIG. 33 is a schematic perspective view of the ejection head bracket.
Figure 34:
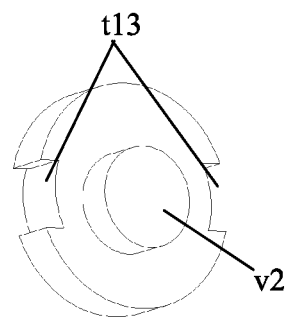
FIG. 34 is a schematic perspective view of the ejection head cover.
Figure 35:
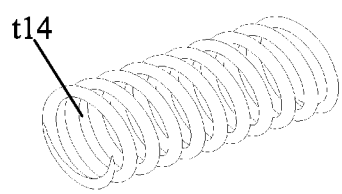
FIG. 35 is a schematic perspective view of the ejection head spring.

The ejection head bracket assembly, as shown in FIG. 30 and FIG. 31, is composed of an ejection head bracket shown in FIG. 33, four ejection head covers shown in FIG. 34, four ejection head springs shown in FIG. 35 and four ejection heads shown in FIG. 36; the ejection head springs are held between the ejection head covers and the ejection heads; one end of inner holes t14 in one end of the ejection head springs shown in FIG. 35 is held on outer circles of convex plates t15 shown in FIG. 36; the inner holes t14 in the other end of the ejection head springs shown in FIG. 35 are held on the outer circles of convex plates v2 shown in FIG. 34; after the two convex plates v2 shown in FIG. 33 are mounted in two grooves t13 in the ejection head covers shown in FIG. 34, and a certain angle is selected for the ejection head covers, the ejection head covers are held in the two grooves s8 shown in FIG. 33; the ejection head bracket assembly is held between the socket base and the socket cover through the ejection head bracket under the action of the elastic force of the bracket spring; and as shown in FIG. 43, under the action of the swing rod and the bracket spring, guide ribs on both sides of the ejection head bracket shown by a12 in FIG. 32 can freely reciprocate up and down along corresponding guide grooves in the socket base shown by d17 in FIG. 45, as shown in FIG. 30. The ejection heads are held on the ejection head bracket; under the action of the elastic force of the ejection head springs, pressure is applied to the tilting contact pieces on the ejection head bracket; meanwhile, under the action of the ejection head springs, the tip end part at position a13 of the ejection heads shown in FIG. 36 is always pressed on outer side surfaces of the four tilting contact pieces; when the ejection head bracket moves up and down, the tilting state of the four tilting contact pieces can be rapidly reversed; when the ejection head assembly moves down, and the tip end part at the position a13 of the ejection heads shown in FIG. 36 moves to pass over a boundary line b16, shown in FIG. 40, of thickness of the tilting contact piece bracket facing one side of the tilting contact piece bracket in the direction of contact points, the ejection heads rapidly reverse the two tilting contact pieces to tilt to the negative contact piece of the battery pack under the action of the ejection head springs, so as to rapidly receive the current from the negative electrode of the battery pack; when the ejection head assembly moves up, and the tip end part at the position a13 of the ejection heads shown in FIG. 36 moves to pass over a boundary line d16, shown in FIG. 40, of thickness of the tilting contact piece bracket opposite to one side of the tilting contact piece bracket in the direction of contact points, the four tilting contact pieces tilt to the central direction shown by b17 in FIG. 45, so that the contact points of the tilting contact pieces are rapidly disconnected from the negative contact piece of the battery pack, thereby playing a role of rapidly disconnecting the current from the negative electrode of the battery pack.

The upper pressing rod, as shown in FIG. 4 and FIG. 24, is held on a tool casing and the swing rod and can move up and down; the end a6 of the upper pressing rod shown in FIG. 22 ejects the position a7 of the swing rod shown in FIG. 23; when the trigger push rod moves inwards under the action of external force, the inclined surface a11 shown in FIG. 29 presses the inclined surface c6 of the upper pressing rod shown in FIG. 22 so that the upper pressing rod rapidly moves down; but when a boundary line c11 at a lower end of the inclined surface a11 of the trigger push rod shown in FIG. 29 passes over a boundary line d6 at an upper end of the inclined surface c6 shown in FIG. 22, and the lower plane b11 of the trigger push rod shown in FIG. 29 is in contact with the upper plane b6 of the upper pressing rod shown in FIG. 22, the position of the upper pressing rod keeps unchanged; but when the trigger push rod moves outwards under the action of the elastic force of the springs, and the trigger push rod moves to the boundary line c11 shown in FIG. 29 to pass over the boundary line d6 shown in FIG. 22, the upper pressing rod can be rapidly and automatically reset under the action of upward elastic force of the ejection head bracket assembly.

The swing rod, as shown in FIG. 30 and FIG. 23, has the end b7 shown in FIG. 23 ejected on a plane of a bulging part at the upper end of the ejection head bracket, and has a hole c7 shown in FIG. 23 held on two fixing ribs at a hole A2 of the socket cover shown in FIG. 25 through the metal pin, and can pivotally swing about the fulcrum A2 shown in FIG. 25; when the trigger push rod moves inwards under the action of the external force, the upper pressing rod moves down, the end a6 of the upper pressing rod shown in FIG. 22 rapidly presses the position a7 of the swing rod shown in FIG. 23 to pivotally swing down about the fulcrum A2 shown in FIG. 25; and under the action of the end b7 of the swing rod shown in FIG. 23, the ejection head bracket assembly rapidly moves down. When the trigger push rod moves outwards under the action of the elastic force of the springs, and the trigger push rod moves to the boundary line c11 shown in FIG. 29 to pass over the boundary line d6 shown in FIG. 22, the ejection head bracket assembly has a space for upward movement; and when the elastic force of the ejection head springs is greater than the pressure of the upper pressing rod, the ejection head bracket assembly ejects the end b7 of the swing rod shown in FIG. 23 to pivotally swing up about the fulcrum A2 shown in FIG. 25 under the action of the elastic force of the ejection head springs, so that the swing rod is automatically reset. Through the action of the swing rod, a stroke of the ejection head bracket can be increased doubly, so that the battery pack socket achieves a rapid on-off function.

Figure 42:
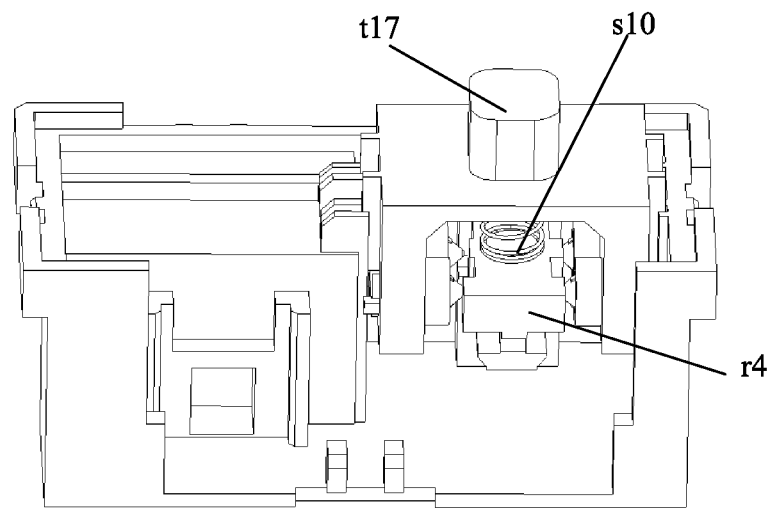
FIG. 42 is a schematicly shows the relationship among the bracket spring, the ejection head bracket assembly and the socket base, wherein t17—ejection head bracket assembly, s10—bracket spring and r4—socket base.

The bracket spring, as shown in FIG. 24, is held between a convex plate A3 shown in FIG. 31 and the socket base A4 shown in FIG. 45, and can eject the ejection head bracket assembly to move up as shown in FIG. 42, so that the two tilting contact pieces are rapidly disconnected from the negative contact piece of the battery pack.

The socket on-off function part, as shown in FIG. 37, is composed of two tilting contact pieces, two auxiliary contact pieces and one tilting contact piece bracket, and is fixed on the socket base shown in FIG. 45 through the tilting contact piece bracket; as shown in FIG. 44, when outer side surfaces of the two tilting plates are under the action of the pressure of the ejection head springs, and the ejection heads move up and down together with the ejection head bracket, the tilting plates can rapidly clamp or separate from the negative connecting piece of the battery pack, so that the battery pack socket generates the on-off function.

The present invention aims at further reducing the proportion of external resistance in the armature circuit and improving operating hardness characteristic of the motor, thereby shortening time for an operating cycle of the tool, increasing the operating efficiency and also saving the usage of batteries.

A technical route of the present invention is to break the structure of an original tool armature circuit, and eliminate the contact points of an original switch. For two connection structures for connecting the output part on the battery pack of original elastic static contact point, one is changed to a multi-contact movable contact point capable of controlling on-off. But the other connection structure for the output part is still an elastic double-sided static contact point; and the difference is that the contact points are distributed on the plane in an isosceles triangle or a regular trapezoid, i.e., the connection structure has at least double-sided three points, with a total of six contact points, and can also be extended to double-sided five points, with a total of ten contacts, and so on.

According to the present invention, the operating efficiency can be increased greatly or an operating power supply can be saved; and the hardness of the operating characteristics of the tool motor can be improved.

The structure of the present invention can replace the on-off function of the switch, and also change the battery pack socket to the double-sided multi-contact contact, thereby greatly reducing the total resistance in the armature circuit of the tool motor.

The above-mentioned description of embodiments is convenient for those ordinary skilled in the art to understand and apply the present invention. Those skilled in the art apparently can make various modifications on these embodiments easily, and apply generic principles described herein to other embodiments without creative work. Therefore, the present invention is not limited to the above-mentioned embodiments; and improvements and modifications made by those skilled in the art according to disclosure of the present invention without departing from the scope of the present invention shall fall within the protection scope of the present invention.

What is claimed is:

1. An armature circuit in an electric tool, comprising:
a power supply and a motor; two electrodes of the power supply are respectively provided with a connection structure for connecting an output part; wherein one of the connection structure is a multi-contact movable contact point structure capable of controlling on-off; and the other is a double-sided multi-contact structure having an on-off function.

2. The armature circuit in the electric tool of claim 1, wherein the movable contact point structure is a double-sided tilting contact structure having a circuit switching function.

3. The armature circuit in the electric tool of claim 2, wherein an auxiliary elastic contact piece is arranged at a tilting position of the double-sided tilting contact structure; and the elastic contact piece is parallel to a contact piece bracket tilted by a tilting contact piece to enhance the stability of tilting contact and increase a number of current channel in parallel.

4. The armature circuit in the electric tool of claim 1, wherein contacts of the double-sided multi-contact structure are arranged in a form of an isosceles triangle or a regular trapezoid.

5. The armature circuit in the electric tool of claim 1, wherein N contact points are arranged on each side of the double-sided multi-contact structure; and N is an integer greater than three and less than seven.

6. A power supply socket for an electric tool, comprising:
a socket housing fixed in a casing of the electric tool, and a connection part of an armature circuit arranged in the socket housing; the connection part further comprises an input part and an output part fixed in the socket housing, wherein the input part and the output part are components of the armature circuit; one end of the input part is connected with one end of a positive electrode or a negative electrode of a power supply by a double-sided multi-contact structure; the other end of the input end is electrically connected with the other electrode of the power supply to form a multi-contact movable contact point structure capable of controlling on-off; and the output part is connected to a required part by an electric wire to form the armature circuit.

7. The power supply socket for the electric tool of claim 6, wherein one end of the input part and one end of the positive electrode or the negative electrode of the power supply are subjected to plug-in elastic connection; the other end of the input part is electrically connected with the other electrode of the power supply to form double-sided tilting connection capable of controlling on-off; the power supply socket further comprises at least two synchronous tilting contact components; the at least two synchronous tilting contact components is connected with an output contact component of one electrode of the power supply, so that a socket has an on-off function; the power supply socket further comprises an ejection head bracket assembly capable of reciprocating up and down, and a bracket spring mounted between the socket housing and the ejection head bracket assembly for making the ejection head bracket assembly move up; two ejection heads inside the ejection head bracket assembly apply pressure to outer sides of the at least two tilting contact components under action of elastic force of the spring; the ejection head bracket assembly enables the ejection heads to move at upper parts and lower parts of pivoting fulcrums of the tilting contact components, so that a tilting state is reversible to realize the on-off function; the power supply socket further comprises a swing rod arranged at the top of socket; and one end of the swing rod is used as the pivoting fulcrum, and the other end props against a bulging part at the upper end of an ejection head bracket, so that the swing rod can pivot about the fulcrum, to compress the ejection head bracket assembly to move down.

8. The power supply socket for the electric tool of claim 7, wherein the plug-in elastic electrical connection of the input part is realized by an elastic contact piece; the elastic contact piece is a double-sided clip formed by bending a conductive elastic material; a front part of the double-sided clip connected with an output contact piece of a battery pack is divided into at least two elastic contact points; the upper end of a division part is further provided with at least one elastic contact point; the three elastic contact points are arranged in a form of an isosceles triangle; and double sides have at least six elastic contact points, i.e., at least six contact resistances are connected in parallel.

9. The power supply socket for the electric tool of claim 7, wherein the electrical connection between the other end of the input part and the output contact piece at the other end of the battery pack is controllable; the electrical connection is realized by at least two tilting contact piece components and one tilting contact piece bracket provided with grooves in both sides; the tilting contact piece bracket is fixed on the socket housing; the two tilting contact piece components are mounted in the grooves in both sides of the bracket; by using positions for contacting bottoms of the grooves with the tilting contact piece components as the fulcrums, the tilting contact piece components pivotally tilt about the fulcrums; when external force is applied to the tilting contact piece components and is moved to one side of the fulcrums facing contact points of the tilting contact piece components, the tilting contact piece components rapidly tilt to the output contact piece of the battery pack, so that the contact points are connected with the output contact piece of the battery pack to complete the electrical connection; and when the external force is moved to one side of the fulcrums opposite to the contact points of the tilting contact piece components, the tilting contact piece components rapidly tilt to an opposite direction, so that the contact points of the tilting contact pieces are rapidly disconnected from the output contact piece of the battery pack to complete electrical disconnection.

10. The power supply socket for the electric tool of claim 7, wherein one end of two elastic auxiliary contact pieces is respectively fixed at outer side parts of the grooves in both sides of the tilting contact piece bracket; the other end of the two auxiliary contact pieces is arranged inside the two tilting contact pieces in an arc surface suspension manner; when pivoting to an output contact piece assembly of the battery pack, the tilting contact piece components first press arc surface parts at the other end of the two auxiliary contact pieces, and then continue to pivot to the output contact piece of the battery pack, until the contact points of the tilting contact components are connected with the output contact piece of the battery pack; at this moment, current from the output contact piece of the battery pack flows to the tilting contact piece assembly through the contacts at one end of the tilting contact components located on both sides of the output contact piece of the battery pack; part of the current flows to the tilting contact piece bracket through the tilting contact pieces and the fulcrums for supporting pivoting of the tilting contact pieces, i.e., the grooves in both sides of the tilting contact piece bracket are pivotally connected with the tilting contact pieces; meanwhile, the other part of the current flows to fixed connection ends fixed on both sides of the tilting contact piece bracket through the arc surface ends of the two auxiliary contact pieces pressed by the tilting contact pieces, i.e., flows to the tilting contact piece bracket; and the two auxiliary contact pieces are respectively bridged at two ends of the at least two tilting contact pieces pivotally connected with the tilting contact piece bracket, to compensate and enhance electrical performance of pivotal connection.

11. The power supply socket for the electric tool of claim 9, wherein the ejection head bracket is in the shape of "r*ı"; each of outer side parts on both sides of the ejection head bracket is provided with a rib; one groove is formed in each of both sides in opposite positions on a socket base of a battery pack socket with the on-off function, so that the ejection head bracket moves up and down under guidance of the grooves; a through hole is formed in each of both sides of the ejection head bracket; ejection heads and ejection head springs are mounted in the through holes; cover plates on outer sides of the bracket are used to enclose outer ends of the circular holes; one end of the ejection head springs is pressed on the cover plates, and the other end is ejected in circular grooves in bottoms of inner holes of the ejection heads; under the action of elastic force of the ejection head springs, the ejection heads move to a direction of a tip end part; one ejection head bracket assembly is composed of the ejection head bracket, the ejection heads, the ejection head springs and the cover plates; and the at least two tilting contact piece components on both sides are pivoted by mounting the at least two tilting contact piece components in the grooves in both sides of the tilting contact piece bracket and using the bottoms of the grooves as the fulcrums; accordingly, when at least two ejection heads in the ejection head bracket assembly are extruded by the elastic force of the ejection head springs, the tip end parts are pressed outside the at least two tilting contact piece components; the ejection head bracket assembly moves up and down in guide grooves; the tip ends of the ejection heads on both sides are simultaneously pressed outside the tilting contact piece components and move up and down together with the bracket; and when the tip ends of the at least two ejection heads pass over the pivoting fulcrums of the at least two tilting contact piece components, the tilting state of the tilting contact piece components is reversed to realize the on-off function.

12. The power supply socket for the electric tool of claim 7, wherein a bracket spring is mounted between a bulging part of the socket base and a lower part of a cross beam of the ejection head bracket; and the elastic force of the bracket spring drives the ejection head bracket assembly to move up along a guide groove.

13. The power supply socket for the electric tool of claim 7, wherein one end of the swing rod is used as the pivoting fulcrum and is arranged at the bulging part at the upper end of a socket cover; the swing rod pivotally swing about the fulcrum; when the other end of the swing rod is pressed to pivotally move down, the ejection head bracket assembly is pressed to move downward along the guide groove, and a force for pressing the swing rod to pivotally move down is smaller than the elastic force of the bracket spring, the bracket spring pushes the ejection head bracket assembly to rise, and one end of the swing rod is pivoted up.

14. The power supply socket for the electric tool of claim 6, wherein the power supply is a battery pack.

15. The power supply socket for the electric tool of claim 6, wherein the electric tool is a battery type electric tool.

* * * * *